(12) United States Patent
Saeki

(10) Patent No.: US 8,594,416 B2
(45) Date of Patent: Nov. 26, 2013

(54) IMAGE PROCESSING APPARATUS, IMAGE PROCESSING METHOD, AND COMPUTER PROGRAM

(75) Inventor: Kazuhito Saeki, Osaka (JP)

(73) Assignee: Keyence Corporation, Osaka (JP)

( * ) Notice: Subject to any disclaimer, the term of this patent is extended or adjusted under 35 U.S.C. 154(b) by 273 days.

(21) Appl. No.: 13/091,218

(22) Filed: Apr. 21, 2011

(65) Prior Publication Data

US 2011/0286659 A1 Nov. 24, 2011

(30) Foreign Application Priority Data

May 21, 2010 (JP) ................................ 2010-117092

(51) Int. Cl.
*G06K 9/00* (2006.01)

(52) U.S. Cl.
USPC ........... 382/141; 382/142; 382/143; 382/144; 382/145

(58) Field of Classification Search
USPC ................................. 382/141–152
See application file for complete search history.

(56) References Cited

U.S. PATENT DOCUMENTS

2006/0257015 A1* 11/2006 Katahata et al. ............. 382/145
2012/0328181 A1* 12/2012 Kitamura et al. ............ 382/145

FOREIGN PATENT DOCUMENTS

| JP | 2005-265661 | 9/2005 |
| JP | 3741672 B2 | 2/2006 |
| JP | 3749090 B2 | 2/2006 |
| JP | 2008-139074 | 6/2008 |

* cited by examiner

Primary Examiner — Ruiping Li
(74) Attorney, Agent, or Firm — Kilyk & Bowersox, P.L.L.C.

(57) ABSTRACT

A plurality of first multivalued images of non-defective items picked up by an image pickup device are obtained, and a plurality of characteristic amounts at least including a pixel value of a color component and edge intensities in two different directions are extracted for each pixel in the obtained first multivalued images. Selection of any one of the plurality of extracted characteristic amounts is received, and the characteristic amount of which selection is received is extracted, whereby a distribution range for determining the non-defective item is calculated. A second multivalued image of a determination target object is obtained, and the characteristic amount of which selection is received is extracted for each pixel in the obtained second multivalued image, whereby determination is made as to whether the characteristic amount is included in the distribution range corresponding to the extracted characteristic amount.

17 Claims, 13 Drawing Sheets

IMAGE PROCESSING APPARATUS, IMAGE PROCESSING METHOD, AND COMPUTER PROGRAM

CROSS-REFERENCE TO RELATED APPLICATIONS

The present application claims foreign priority based on Japanese Patent Application No. 2010-117092, filed May 21, 2010, the contents of which is incorporated herein by reference.

BACKGROUND OF THE INVENTION

1. Field of the Invention

The present invention relates to an image processing apparatus, an image processing method, and a computer program for comparing a multivalued image obtained by picking up an image of a determination target object with a reference multivalued image.

2. Description of the Related Art

Conventionally, a method has been developed to determine whether a determination target object is a non-defective item or not by simply comparing a multivalued image obtained by picking up an image of the determination target object with a reference multivalued image. However, in this simple comparison between the images, it is impossible to consider changes in pixel values caused by variation of a shape of the non-defective item itself, calculation errors, noises, and the like, and there is a problem in that it may be impossible to correctly determine a non-defective item. For example, even a non-defective item may be falsely determined as a defective item.

In order to solve such a problem, for example, Japanese Unexamined Patent Publication No. 2005-265661 discloses a technique in which multivalued images are prepared for a plurality of non-defective items, and mean value images and standard deviation images thereof are obtained. In this technique, a determination can be stably made as to whether an object is defective or not. More specifically, aligning is made with respect to the multivalued images for the plurality of non-defective items, and thereafter, a mean value and a standard deviation are calculated for a pixel value of a pixel at each coordinate. The multivalued image of a determination target object is aligned with the multivalued images of the non-defective items. Thereafter, a difference value with a mean value is calculated for a pixel at each coordinate, and comparison is made with a defined threshold value image for each pixel based on the standard deviation, whereby determination is made as to whether the object is a non-defective item or not.

In this method, variations of pixel values due to variation in the shape of the non-defective item itself, calculation errors, noises, and the like can be effectively eliminated in accordance with the degree of variation of a pixel value at each pixel, and since a range in which an object is determined to be a non-defective item is different in each pixel, an appropriate threshold value for determining a non-defective item can be defined for each portion. Therefore, a non-defective item can be determined with high accuracy.

However, in the image processing method disclosed in Japanese Unexamined Patent Publication No. 2005-265661, when there is a defect in proximity to a contour line, it is difficult to recognize the defect since the standard deviation of the pixel value is large. Therefore, there is a problem in that the sensitivity for detecting defect is reduced. The reason why the standard deviation of the pixel value is large in proximity to the contour line is due to a small difference in the alignment, a small difference in the imaging position, variation of individual non-defective items, and the like.

In a black and white image, it may be difficult to detect difference of colors. Moreover, there is a problem in that, when there is a large variation in the overall gray level, it is difficult to detect a portion where the brightness is partially different, e.g., a portion where a surface is recessed.

SUMMARY OF THE INVENTION

The present invention has been made in view of the above circumstances, and an object of the present invention is to provide an image processing apparatus, an image processing method, and a computer program for selecting an appropriate characteristic amount extraction device for even a defect and a color difference in proximity to a contour line, thus being capable of detecting presence with high accuracy and reliably determining a non-defective item.

In order to achieve the above object, according to one embodiment of the invention, there is provided an image processing apparatus for determining a non-defective item by comparing a multivalued image obtained by picking up an image of a determination target object with a multivalued image group of non-defective items, the image processing apparatus including: a non-defective item image acquisition device for obtaining a plurality of first multivalued images of non-defective items picked up by an image pickup device; a selection reception device for receiving selection of any one of a plurality of characteristic amount extraction devices including at least a first characteristic amount extraction device and a second characteristic amount extraction device, wherein the first characteristic amount extraction device extracts, as a characteristic amount, a pixel value of a color component for each pixel in the obtained first multivalued images, the second characteristic amount extraction device extracts, as a characteristic amount, edge intensities in two different directions for each pixel in the obtained first multivalued images; a distribution range calculation device for calculating a distribution range for determining the non-defective item based on a characteristic amount extracted by a characteristic amount extraction device of which selection is received; a multivalued image acquisition device for obtaining a second multivalued image of a determination target object; and a determination device for extracting, for each pixel in the obtained second multivalued image, a characteristic amount with the characteristic amount extraction device of which selection is received, and determining whether the characteristic amount is included in the distribution range corresponding to the extracted characteristic amount.

According to another embodiment of the invention, in the image processing apparatus according to the first aspect, when selection of the first characteristic amount extraction device is received, the distribution range calculation device includes: a pixel mean value calculation device for calculating a mean value of pixel values of color components in respective pixels in the obtained first multivalued images; and a pixel value distribution range calculation device for calculating a distribution range of pixel values in a multidimensional space, in which the color components are respectively adopted as coordinate axes, for each pixel in the first multivalued images based on the calculated mean values of the pixel values of the color components, the determination device is configured to calculate a pixel value of a color component for each pixel in the obtained second multivalued image, and determine whether the pixel value is included in the distribution range of the pixel values in the multidimensional space in which the color components are respectively adopted as coordinate axes, and when selection of the second characteristic amount extraction device is received, the distribution range calculation device includes: a direction-based edge intensity calculation device for calculating edge intensities in two different directions for each pixel in the obtained first multivalued images; an edge intensity mean value calculation device for calculating a mean value of edge intensities in two different directions for each pixel in the first multivalued images, based on the calculated edge intensities; and an edge intensity distribution range calculation device for calculating an intercorrelation distribution range of edge intensities in two different directions for each pixel in the first multivalued images with the calculated mean value being a center, and the determination device is configured to calculate edge intensities in two different directions for each pixel in the obtained second multivalued image, and determine whether the edge intensities are included in the intercorrelation distribution range corresponding to the calculated edge intensities.

According to another embodiment of the invention, in the image processing apparatus according to the second aspect, the direction-based edge intensity calculation device is configured to calculate the edge intensities in two directions perpendicular to each other.

According to another embodiment of the invention, in the image processing apparatus according to the third aspect, the direction-based edge intensity calculation device is configured to calculate the edge intensities in two directions of a row direction and a column direction in a two-dimensional image.

According to another embodiment of the invention, in the image processing apparatus according to any one of the first to fourth aspects, the distribution range calculation device is configured to calculate the intercorrelation distribution range as a virtual elliptic region.

According to another embodiment of the invention, in the image processing apparatus according to the fifth aspect, the determination device includes a distance calculation device for calculating a Mahalanobis distance obtained by normalizing a distance from a barycenter of the virtual elliptic region to the characteristic amount extracted from the second multivalued image for each pixel of the second multivalued image using a distance between the barycenter and a boundary of the elliptic region in a direction from the barycenter to the characteristic amount, the determination as to whether the edge intensities are included in the intercorrelation distribution range is configured to be made by determining whether the calculated Mahalanobis distance is less than a predetermined value or not.

According to another embodiment of the invention, in the image processing apparatus according to the fifth aspect, the distance calculation device is configured to calculate a Euclidean distance which is a distance from a barycenter of the virtual elliptic region to the characteristic amount extracted from the second multivalued image for each pixel of the second multivalued image, and the determination device is configured to determine whether the edge intensities are included in the intercorrelation distribution range or not by determining whether the calculated Euclidean distance is less than a predetermined value or not.

According to another embodiment of the invention, the image processing apparatus according to any one of the first to seventh aspects further includes a position adjustment device for aligning the first multivalued images and the second multivalued image.

According to another embodiment of the invention, the image processing apparatus according to any one of the first to eighth aspects further includes a third characteristic amount extraction device for extracting a characteristic amount of a surface roughness of the determination target object, wherein when selection of the third characteristic amount extraction device is received, the distribution range calculation device is configured to calculate a mean value and a distribution range of each pixel based on a roughness characteristic amount of each pixel of the obtained first multivalued images, and determine whether a difference value between the mean value and a roughness characteristic amount of the second multivalued image for each pixel is less than a predetermined value or not.

According to another embodiment of the invention, in the image processing apparatus according to any one of the first to ninth aspects, when the selection reception device receives selection of a plurality of characteristic amount extraction devices, and any one of the characteristic amounts extracted by the characteristic amount extraction devices of which selection is received is determined not to be included in the distribution range corresponding to the characteristic amount, the determination device determines that the determination target object is not a non-defective item.

Subsequently, in order to achieve the above object, according to another embodiment of the invention, there is provided an image processing method that is executed by an image processing apparatus for determining a non-defective item by comparing a multivalued image obtained by picking up an image of a determination target object with a multivalued image group of non-defective items, the image processing method including the steps of obtaining a plurality of first multivalued images of non-defective items picked up by an image pickup device; receiving selection of any one of a plurality of extraction steps including at least a first extraction step and a second extraction step, wherein the first extraction step extracts, as a characteristic amount, a pixel value of a color component for each pixel in the obtained first multivalued images, the second extraction step extracts, as a characteristic amount, edge intensities in two different directions for each pixel in the obtained first multivalued images; extracting a characteristic amount with an extraction step of which selection is received, and calculating a distribution range for determining the non-defective item based on the extracted characteristic amount; obtaining a second multivalued image of the determination target object; and extracting, for each pixel in the obtained second multivalued image, a characteristic amount with the extraction step of which selection is received, and determining whether the characteristic amount is included in the distribution range corresponding to the extracted characteristic amount.

Subsequently, in order to achieve the above object, according to another embodiment of the invention, there is provided a computer program that is executed by an image processing apparatus for determining a non-defective item by comparing a multivalued image obtained by picking up an image of a determination target object with a multivalued image group of non-defective items, the computer program causing the image processing apparatus to function as: a non-defective item image acquisition device for obtaining a plurality of first multivalued images of non-defective items picked up by an image pickup device; a selection reception device for receiving selection of any one of a plurality of characteristic amount extraction devices including at least a first characteristic amount extraction device and a second characteristic amount extraction device, wherein the first characteristic amount extraction device extracts, as a characteristic amount, a pixel value of a color component for each pixel in the obtained first multivalued images, the second characteristic amount extraction device extracts, as a characteristic amount, edge intensities in two different directions for each pixel in the obtained first multivalued images; a distribution range calculation device for calculating a distribution range for determining the non-defective item based on a characteristic amount extracted by a characteristic amount extraction device of which selection is received; a multivalued image acquisition device for obtaining a second multivalued image of the determination target object; and a determination device for extracting, for each pixel in the obtained second multivalued image, a characteristic amount with the characteristic amount extraction device of which selection is received, and determining whether the characteristic amount is included in the distribution range corresponding to the extracted characteristic amount.

According to the first, eleventh, and twelfth aspects of the embodiments, a plurality of first multivalued images of non-defective items picked up by an image pickup device are obtained. Selection of any one of a plurality of characteristic amount extraction devices is received. The plurality of characteristic amount extraction devices include at least a first characteristic amount extraction device and a second characteristic amount extraction device. The first characteristic amount extraction device extracts, as a characteristic amount, a pixel value of a color component for each pixel in the obtained first multivalued images. The second characteristic amount extraction device extracts, as a characteristic amount, edge intensities in two different directions for each pixel in the obtained first multivalued images. A distribution range for determining the non-defective item is calculated based on a characteristic amount extracted by a characteristic amount extraction device of which selection is received. A second multivalued image of a determination target object is obtained. For each pixel in the obtained second multivalued image, a characteristic amount is extracted with the characteristic amount extraction device of which selection is received, and determination is made as to whether the characteristic amount is included in the distribution range corresponding to the extracted characteristic amount. Therefore, a characteristic amount extraction device can be selected according to a property of the second multivalued image, whereby a defect can be detected by selecting an appropriate characteristic amount even when the defect occurs in proximity to a contour line, and a color difference can also be detected with high sensitivity. For example, when a characteristic amount of which selection is received is a pixel value of a color component, a color different from the non-defective items can be detected. When the characteristic amount of which selection is received includes edge intensities in two different directions, a defect in proximity to a contour line can be detected.

According to the second aspect of the embodiments, when selection of a pixel value of a color component serving as a characteristic amount to be extracted is received, a mean value of pixel values of color components in respective pixels in the obtained first multivalued images is calculated, and a distribution range of pixel values in a multidimensional space, in which the color components are respectively adopted as coordinate axes, is calculated for each pixel in the first multivalued images based on the calculated mean values of the pixel values of the color components. A pixel value of a color component for each pixel in the obtained second multivalued image is calculated, and determination is made as to whether the pixel value is included in the distribution range of the pixel values in the multidimensional space in which the color components are respectively adopted as coordinate axes. On the other hand, when selection of edge intensities in two different directions as a characteristic amount to be extracted is received, edge intensities in two different directions are calculated for each pixel in the obtained first multivalued images. A mean value of edge intensities in two different directions for each pixel in the first multivalued images is calculated based on the calculated edge intensities. An intercorrelation distribution range of edge intensities in two different directions is calculated for each pixel in the first multivalued images with the calculated mean value being a center. Edge intensities in two different directions are calculated for each pixel in the obtained second multivalued image. Determination is made as to whether the edge intensities are included in the intercorrelation distribution range corresponding to the calculated edge intensities. Therefore, when the characteristic amount of which selection is received is a pixel value of a color component, a color difference can be detected by determining whether the pixel value is included in the calculated distribution range of the pixel value. When the characteristic amount of which selection is received includes edge intensities in two different directions, a defect in proximity to a contour line can be detected by determining whether the edge intensities are included in the calculated intercorrelation distribution range of the edge intensities.

According to the third aspect of the embodiments, the edge intensities are calculated in two directions perpendicular to each other. Therefore, the distribution range can be easily calculated, and the load of arithmetic processing can be reduced.

According to the fourth aspect of the embodiments, the edge intensities are calculated in two directions of a row direction and a column direction in a two-dimensional image. Therefore, it becomes easier to calculate the intercorrelation distribution range, and the load of the arithmetic processing can be further reduced.

According to the fifth aspect of the embodiments, the intercorrelation distribution range is calculated as a virtual elliptic region. This makes it easier to determine whether the edge intensities in two different directions calculated for each pixel in the second multivalued image are included in the intercorrelation distribution range.

According to the sixth aspect of the embodiments, a Mahalanobis distance is calculated by normalizing a distance from a barycenter of the virtual elliptic region to the characteristic amount extracted from the second multivalued image for each pixel of the second multivalued image using a distance between the barycenter and a boundary of the elliptic region in a direction from the barycenter to the characteristic amount. The determination as to whether the edge intensities are included in the intercorrelation distribution range is made by determining whether the calculated Mahalanobis distance is less than a predetermined value or not. Therefore, since the Mahalanobis distance is used, the distance from the barycenter to the edge intensities can be represented as a ratio with respect to the distance between the barycenter and the boundary line of the intercorrelation distribution range. The determination as to whether the edge intensities are included in the intercorrelation distribution range can thus be made with a sensitivity according to the extension of distribution of the non-defective items.

According to the seventh aspect of the embodiments, a Euclidean distance, which is a distance from a barycenter of the virtual elliptic region to the characteristic amount extracted from the second multivalued image for each pixel of the second multivalued image, is calculated. The determination as to whether the edge intensities are included in the intercorrelation distribution range or not is made by determining whether the calculated Euclidean distance is less than a predetermined value or not. Therefore, since the Euclidean distance is used, the degree of displacement from the intercorrelation distribution range in which an object is determined to be a non-defective item can be calculated without greatly changing the sensitivity due to the magnitude of the extension of distribution.

According to the eighth aspect of the embodiments, the first multivalued images and the second multivalued image are aligned. The determination as to whether the edge intensities in two different directions calculated for each pixel in the second multivalued image are included in the intercorrelation distribution range or not can be made accurately.

According to the ninth aspect of the embodiments, a third characteristic amount extraction device is provided to extract a characteristic amount of a surface roughness of the determination target object. When selection of the third characteristic amount extraction device is received, the distribution range calculation device calculates a mean value and a distribution range of each pixel based on a roughness characteristic amount of each pixel of the obtained first multivalued images, and determines whether a difference value between the mean value and a roughness characteristic amount of the second multivalued image for each pixel is less than a predetermined value or not. Therefore, roughness, the degree of asperity, and the like of the multivalued image of the determination target object can be distinguished, and the difference of the surface roughness of the determination target object can be reliably detected.

According to the tenth aspect of the embodiments, when selection of a plurality of characteristic amount extraction devices is received, and it is determined that any of the characteristic amounts extracted by the characteristic amount extraction devices of which selection is received is not included in the distribution range corresponding to the characteristic amount, the determination device determines that the determination target object is not a non-defective item. Therefore, even when a determination target object, which is not a non-defective item, is falsely determined to be a non-defective item based on an inappropriate characteristic amount, the determination target object can be correctly determined not to be a non-defective item based on an appropriate characteristic amount.

According to the present invention, at least one from characteristic amounts serving as a basis for determining whether an object is a non-defective item or not can be selected according to a property of the second multivalued image. Therefore, even when the defect occurs in proximity to a contour line, a defect can be detected by selecting an appropriate characteristic amount, and color difference can also be detected with a high sensitivity. For example, when a characteristic amount of which selection is received is a pixel value of a color component, a color different from the non-defective items can be detected. When the characteristic amount of which selection is received includes edge intensities in two different directions, a defect in proximity to a contour line can be detected.

DETAILED DESCRIPTION OF THE PREFERRED EMBODIMENTS

Figure 1:
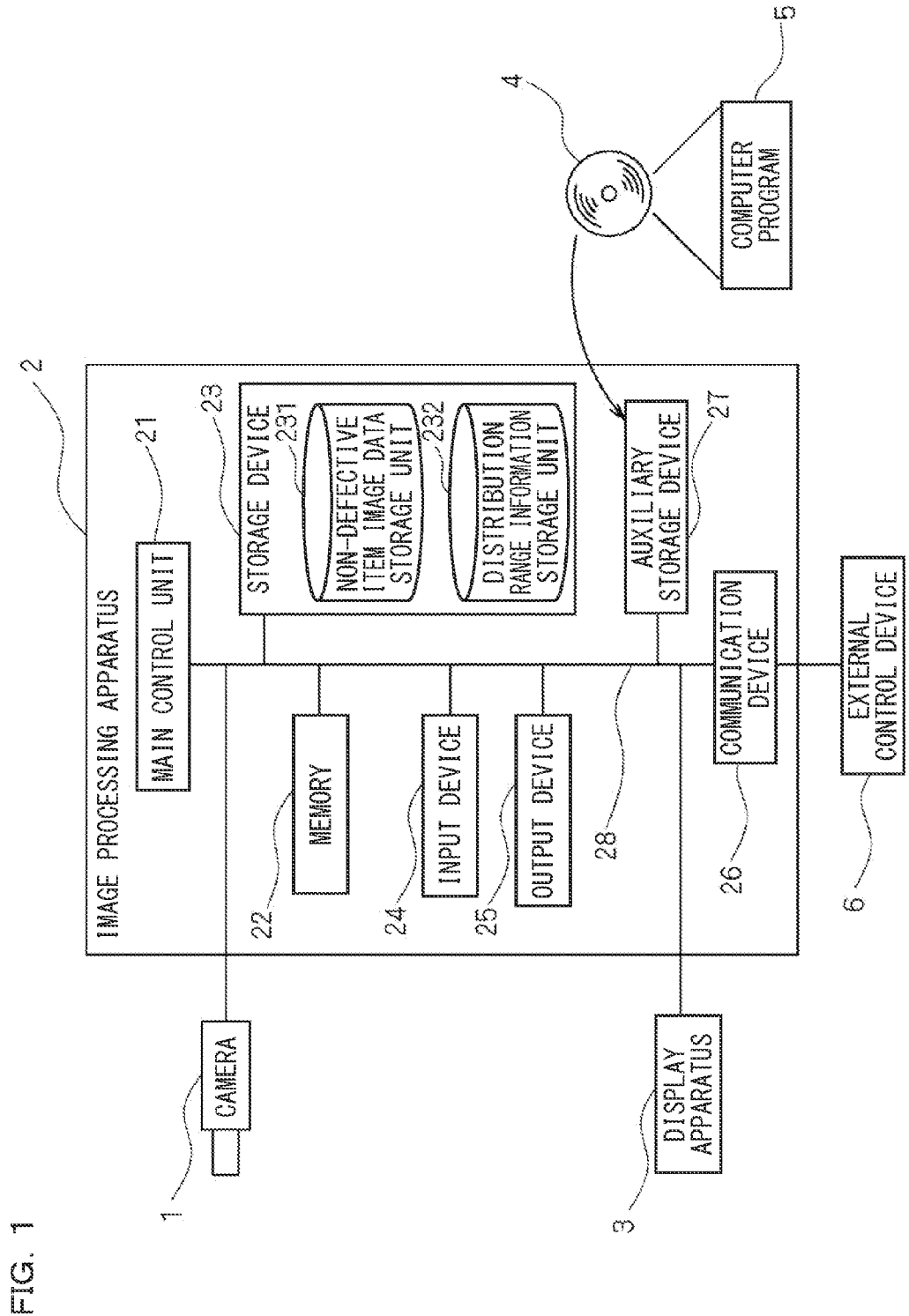
FIG. 1 is a block diagram schematically illustrating a configuration of an image processing apparatus according to a first embodiment of the present invention.

An image processing apparatus according to embodiments of the present invention will be hereinafter described with reference to the drawings. Elements having the same or corresponding configurations or functions are denoted with the same or corresponding reference numerals throughout the referenced drawings, and detailed descriptions thereof will not be given.

First Embodiment

FIG. 1 is a block diagram schematically illustrating a configuration of an image processing apparatus according to a first embodiment of the present invention. As shown in FIG. 1, an image processing apparatus 2 according to the first embodiment is connected to a camera 1 and a display apparatus 3. The camera 1 serves as an image pickup device for picking up a multivalued image. The display apparatus 3 serves as an image display device for displaying the picked-up multivalued image or an image generated during arithmetic processing.

The image processing apparatus 2 includes a main control unit 21 configured by at least a CPU (central processing unit), an LSI, and the like, a memory 22, a storage device 23, an input device 24, an output device 25, a communication device 26, an auxiliary storage device 27, and an internal bus 28 connecting the above pieces of hardware. The main control unit 21 is connected to each of the above hardware units of the image processing apparatus 2 via the internal bus 28. The main control unit 21 controls the operation of each of the above hardware units and executes various kinds of software functions in accordance with a computer program 5 stored in storage device 23. The memory 22 is made up of a volatile memory such as an SRAM and an SDRAM. A load module is extracted to the memory 22 when the computer program 5 is executed, and the memory 22 stores temporary data and the like which are generated when the computer program 5 is executed.

The storage device 23 is made up of a fixed-type storage apparatus (a hard disk, a flash memory) built therein, an ROM, or the like. The computer program 5 stored in the storage device 23 is downloaded by the auxiliary storage device 27 from a portable recording medium 4 such as a DVD, a CD-ROM or a flash memory where pieces of information such as a program and data are recorded, and at the time of execution, the computer program 5 is extracted from the storage device 23 to the memory 22 and executed. Naturally, the computer program 5 may be a computer program downloaded from an external computer through the communication device 26.

The storage device 23 includes a non-defective item image data storage unit 231 and a distribution range information storage unit 232. The non-defective item image data storage unit 231 stores a plurality of pieces of multivalued image data that are obtained of non-defective items. The distribution range information storage unit 232 stores information about a distribution range (distribution range information) calculated for each characteristic amount based on a plurality of multi-valued image data of non-defective items that are stored in the non-defective item image data storage unit 231. Determination is made as to whether a determination target object is a non-defective item or not by determining whether a characteristic amount about the determination target object is included in a distribution range identified based on the distribution range information stored in the distribution range information storage unit 232.

The communication device 26 is connected to the internal bus 28, and is capable of transmitting and receiving data to and from the external computer and the like by being connected to an external network such as the Internet, a LAN, a WAN, or the like. That is, the storage device 23 is not limited to being incorporated within the image processing apparatus 2. The storage device 23 may be an external recording medium such as a hard disk installed in an external server computer, connected through the communication device 26.

The input device 24 is a broad concept generally including not only a data input medium such as a keyboard or a mouse but also apparatuses that acquire input information from a touch panel integrated with a liquid crystal panel. The output device 25 means a printing apparatus such as a laser printer or a dot printer.

The camera (image pickup device) 1 is a CCD camera or the like having a CCD image pickup element. The display apparatus 3 is a display apparatus having a CRT, a liquid crystal panel, and the like. The camera 1, the display apparatus 3, and the like may be integrated with the image processing apparatus 2, or may be provided separately therefrom. An external control device 6 is a control device connected via the communication device 26. For example, the external control device 6 corresponds to a PLC (programmable logic controller). In this case, the external control device 6 generally means apparatuses executing post processing in accordance with image processing results provided by the image processing apparatus 2.

Figure 2:
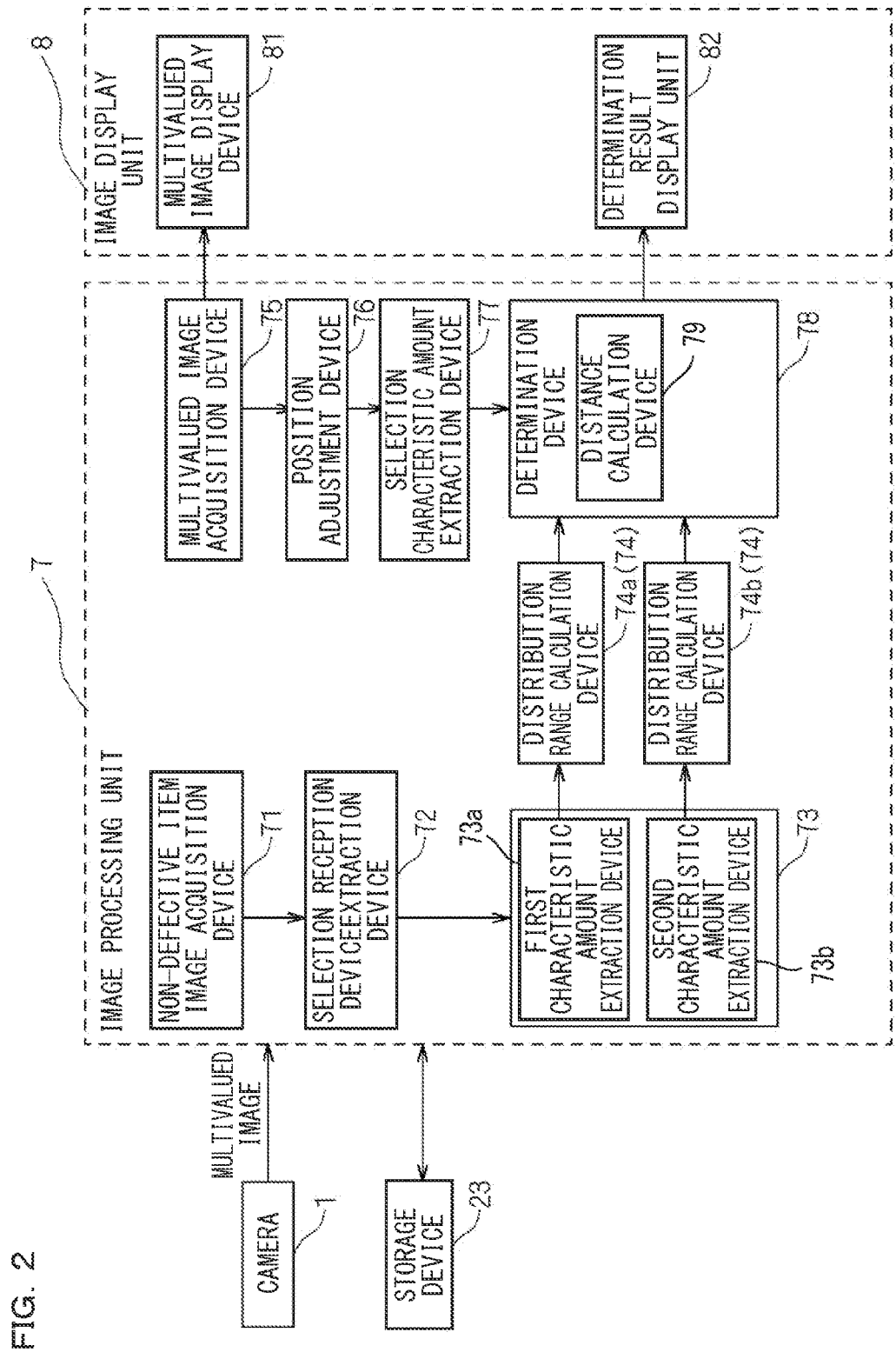
FIG. 2 is a functional block diagram illustrating an example of the configuration of the image processing apparatus according to the first embodiment of the present invention.

FIG. 2 is a functional block diagram illustrating an example of the configuration of the image processing apparatus 2 according to the first embodiment of the present invention. In FIG. 2, the image processing apparatus 2 according to the first embodiment includes a camera 1, an image processing unit 7 for executing processing of the image processing apparatus 2, a storage device 23, and an image display unit 8.

For example, the camera 1 is a digital camera, which picks up an image of, e.g., a film surface as a determination target object, obtains a multivalued image, and outputs the multi-valued image to the image processing unit 7.

The image processing unit 7 includes a non-defective item image acquisition device 71, a selection reception device 72, a characteristic amount extraction device 73, a distribution range calculation device 74, a multivalued image acquisition device 75, a position adjustment device 76, a selection characteristic amount extraction device 77, and a determination device 78. The image processing unit 7 includes a main control unit 21, a memory 22, an external I/F, and the like, and controls processing operations of the non-defective item image acquisition device 71, the selection reception device 72, the characteristic amount extraction device 73, the distribution range calculation device 74, the multivalued image acquisition device 75, the position adjustment device 76, the selection characteristic amount extraction device 77, and the determination device 78.

The storage device 23 functions as an image memory, and stores, as necessary, pieces of multivalued image data of multivalued images picked up by the camera 1 and the pieces of image data that are obtained after various kinds of processings, such as adjustment and mean value calculation performed by the image processing unit 7, are performed on the image data. The storage device 23 may store pixel value data of each pixel instead of storing image data.

The image display unit 8 is made of the display apparatus 3 such as a monitor for a computer. The image display unit 8 displays, on the display screen of the display apparatus 3, a multivalued image obtained by picking up an image of a determination target object, i.e., an object subjected to determination as to whether it is a non-defective item or not, and a determination result as to whether it is a non-defective item or not. In other words, a multivalued image display device 81 displays a multivalued image according to an instruction of the image processing unit 7 on a display screen of the display apparatus 3. The determination result display unit 82 displays a determination result indicating whether a determination target object is a non-defective item or not, on the display screen of the display apparatus 3.

Subsequently, each constituent element of the image processing unit 7 will be described.

The non-defective item image acquisition device 71 obtains a plurality of multivalued images (first multivalued images) of the non-defective item picked up by the camera 1. In other words, a plurality of multivalued images are obtained by picking up the images of the non-defective items, whereby a plurality of characteristic amounts can be calculated for each pixel in the obtained multivalued images. The obtained multivalued image data of the multivalued images are stored to the non-defective item image data storage unit 231 of the storage device 23.

The selection reception device 72 receives selection of at least one from a plurality of characteristic amount extraction devices for extracting characteristic amounts. In other words, in the first embodiment, the selection reception device 72 receives selection of either a first characteristic amount extraction device 73*a* or a second characteristic amount extraction device 73*b* described later. The selection reception device 72 may receive selection of any one of the first characteristic amount extraction device 73*a* and the second characteristic amount extraction device 73*b* or may receive selection of both of the first characteristic amount extraction device 73*a* and the second characteristic amount extraction device 73*b*. Further, it is to be understood that the selection reception device 72 may receive selection from among a plurality of other characteristic amount extraction devices including a third characteristic amount extraction device described later.

The characteristic amount extraction device 73 includes the first characteristic amount extraction device 73*a* and the second characteristic amount extraction device 73*b*. The first characteristic amount extraction device 73*a* extracts, as a characteristic amount, a pixel value of a color component for each pixel in an obtained multivalued image. The second characteristic amount extraction device 73*b* extracts, as a characteristic amount, edge intensities in two different directions for each pixel in the obtained multivalued image. When the characteristic amount is a pixel value of a color component, a difference of color can be detected. When the characteristic amount is edge intensities in two different directions, a defect in proximity to a contour line can be detected.

The distribution range calculation device 74 calculates a distribution range for determining a non-defective item based on the characteristic amount extracted by the characteristic amount extraction device 73 of which selection is received. When the selection of the first characteristic amount extraction device 73*a* is received, the distribution range calculation device 74*a* calculates a distribution range. When the selection of the second characteristic amount extraction device 73*b* is received, the distribution range calculation device 74*b* calculates a distribution range. The information about the calculated distribution ranges is stored to the distribution range information storage unit 232 of the storage device 23 as a function expression, a coordinate value, and a threshold value representing a boundary of a distribution range.

The multivalued image acquisition device 75 obtains a multivalued image (second multivalued image) of a determination target object picked up by the camera 1. The position adjustment device 76 aligns the obtained multivalued image of the determination target object with the multivalued image (first multivalued image) of the non-defective item. More specifically, the position adjustment device 76 calculates mean value images of the plurality of multivalued images of the non-defective items, and the multivalued image is aligned with the mean value images.

Means for aligning the multivalued images is not particularly limited as long as it is a well-known technique. For example, the positions of both of multivalued images may be detected by pattern matching, and they may be aligned using a maximum value and a minimum value between which they are determined to match each other. Alternatively, the degree of match between both of the multivalued images may be calculated by calculating a normalization correlation and the like, and they may be aligned so that the degree of match attains a value more than a predetermined value. It should be noted that both of the multivalued images may be aligned in such a manner that contour lines, sizes of areas, barycenters, and the like of the multivalued images match each other.

For each pixel in the obtained multivalued image of the determination target object, the selection characteristic amount extraction device 77 extracts a characteristic amount using the same characteristic amount extraction device as the characteristic amount extraction device 73 of which selection is received by the selection reception device 72. For example, when selection of the first characteristic amount extraction device 73*a* is received, the selection characteristic amount extraction device 77 extracts, as a characteristic amount, a pixel value of a color component for each pixel in the multivalued image of the determination target object. When selection of the second characteristic amount extraction device 73*b* is received, the selection characteristic amount extraction device 77 extracts, as a characteristic amount, edge intensities in two different directions for each pixel in the multivalued image of the determination target object.

For each pixel in the obtained multivalued image of the determination target object, the determination device 78 extracts the corresponding characteristic amount using the characteristic amount extraction device 73 of which selection is received, and determines whether the extracted characteristic amount is included in the distribution range for the corresponding characteristic amount of the plurality of multivalued images of the non-defective item that have already been calculated. When the determination device 78 determines that the extracted characteristic amount is included in the distribution range, the determination device 78 determines that the determination target object is a non-defective item. When the determination device 78 determines that the extracted characteristic amount is not included in the distribution range, the determination device 78 determines that the determination target object is not a non-defective item.

Figure 3:
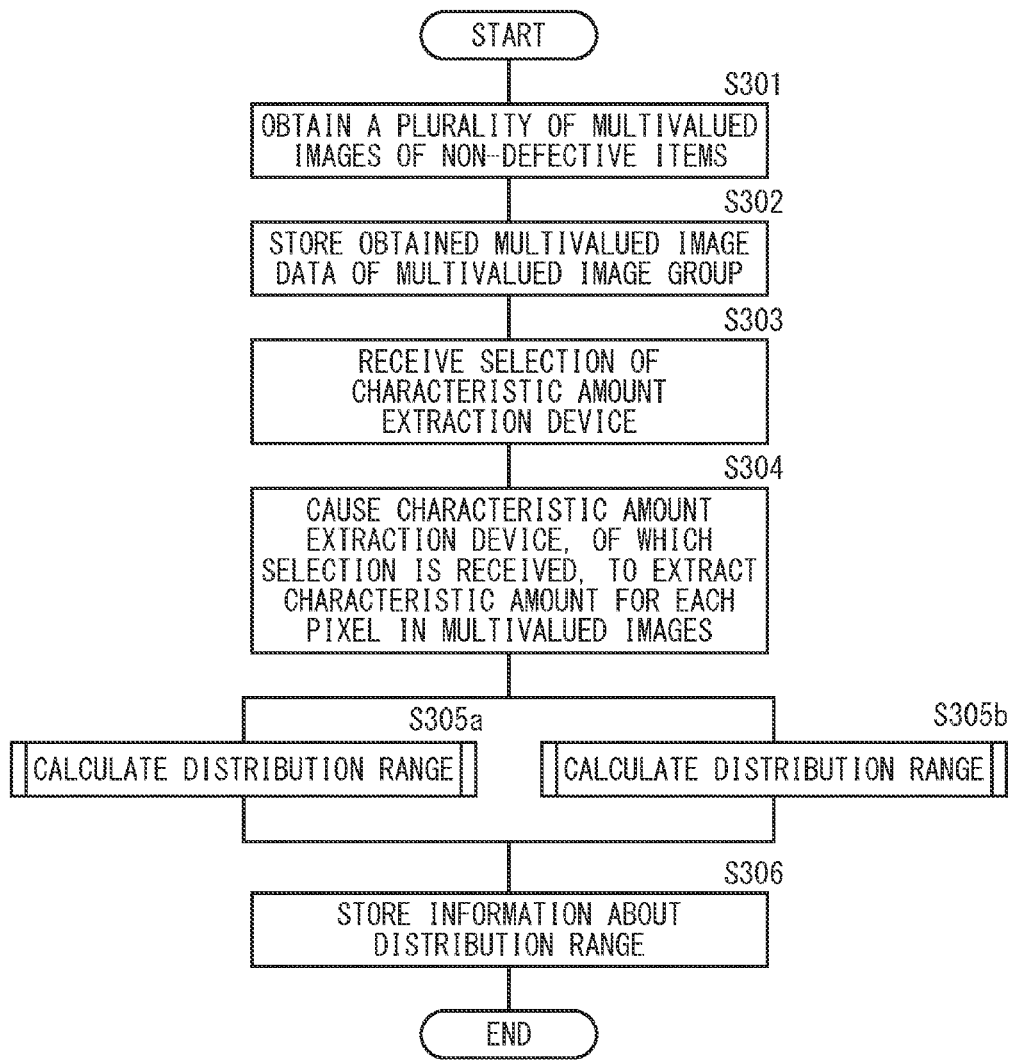
FIG. 3 is a flowchart illustrating a procedure of non-defective item information collection processing performed by a main control unit of the image processing apparatus according to the first embodiment of the present invention.

FIG. 3 is a flowchart illustrating a procedure of a non-defective item information collection processing performed by the main control unit 21 of the image processing apparatus 2 according to the first embodiment of the present invention. The main control unit 21 of the image processing apparatus 2 obtains a plurality of multivalued images (first multivalued images) of non-defective items picked up by the camera 1 (step S301). The main control unit 21 stores the obtained multivalued image data of the multivalued image group to the non-defective item image data storage unit 231 of the storage device 23 (step S302).

The main control unit 21 receives selection of the characteristic amount extraction device 73 with which characteristic amounts are extracted from multivalued images (step S303). The characteristic amount extraction device 73 to be selected includes the first characteristic amount extraction device 73a and the second characteristic amount extraction device 73b. The first characteristic amount extraction device 73a extracts, as a characteristic amount, a pixel value of a color component for each pixel of the obtained multivalued image. The second characteristic amount extraction device 73b extracts, as a characteristic amount, edge intensities in two different directions for each pixel in the obtained multivalued image. It should be noted that only one characteristic amount extraction device 73 may be selected, or a plurality of characteristic amount extraction devices 73 may be selected.

The main control unit 21 causes the characteristic amount extraction device 73, of which selection is received, to extract a characteristic amount for each pixel in the multivalued images (step S304), and calculates a distribution range for determining a non-defective item (steps S305a, S305b). When selection of only one characteristic amount extraction device 73 is received, the distribution range is calculated only in step S305a. When selection of two characteristic amount extraction devices 73 is received, the corresponding distribution ranges are calculated in steps S305a, S305b. The main control unit 21 stores information about the calculated distribution range to the distribution range information storage unit 232 of the storage device 23 as a function expression, a coordinate value, and a threshold value representing a boundary of a distribution range (step S306).

Figure 4:
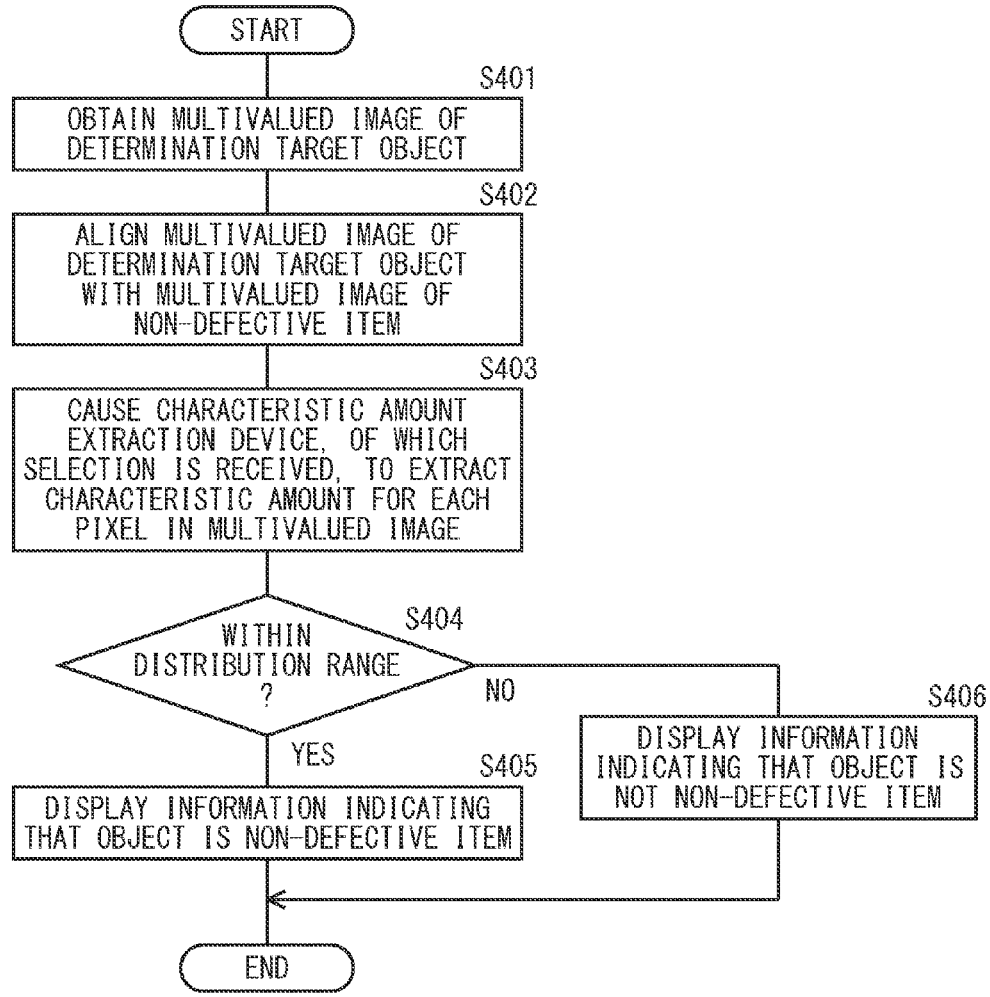
FIG. 4 is a flowchart illustrating a procedure of non-defective item determination processing performed by a main control unit of the image processing apparatus according to the first embodiment of the present invention.

FIG. 4 is a flowchart illustrating a procedure of non-defective item determination processing performed by the main control unit 21 of the image processing apparatus 2 according to the first embodiment of the present invention. The main control unit 21 of the image processing apparatus 2 obtains a multivalued image (second multivalued image) of a determination target object picked up by the camera 1 (step S401). The main control unit 21 aligns the obtained multivalued image of the determination target object with the multivalued image (first multivalued image) of the non-defective item (step S402). More specifically, the main control unit 21 calculates mean value images of the plurality of multivalued images of the non-defective items, and the multivalued image is aligned with the mean value images.

The main control unit 21 causes the characteristic amount extraction device 73, of which selection is received, to extract a characteristic amount for each pixel in the obtained multivalued image of the determination target object (step S403). For example, when selection of the first characteristic amount extraction device 73a as the characteristic amount extraction device 73 for extracting pixel values of color components is received, the first characteristic amount extraction device 73a extracts, as a characteristic amount, a pixel value of a color component for each pixel of the multivalued image of the determination target object. When selection of the second characteristic amount extraction device 73b for extracting edge intensities in two different directions is received, the second characteristic amount extraction device 73b extracts, as a characteristic amount, edge intensities in two different directions for each pixel in the multivalued image of the determination target object.

The main control unit 21 determines whether the extracted characteristic amount is included in the calculated distribution ranges of the characteristic amounts of the plurality of multivalued images of the non-defective items (step S404). When the main control unit 21 determines that the extracted characteristic amount is included in the distribution ranges (step S404: YES), the main control unit 21 determines that the determination target object is a non-defective item, and displays information indicating that the determination target object is a non-defective item on the display screen of the display apparatus 3 as a determination result (step S405).

When the main control unit 21 determines that the extracted characteristic amount is not included in the distribution ranges (step S404: NO), the main control unit 21 determines that the determination target object is not a non-defective item, and displays information indicating that the determination target object is not a non-defective item on the display screen of the display apparatus 3 as a determination result (step S406). When selection of a plurality of characteristic amount extraction devices 73 is received, determination is made as follows. When the determination target object is determined not to be a non-defective item in at least one from determination results provided in the determination of non-defective item using the characteristic amount extracted by the characteristic amount extraction device 73 of which selection is received, the determination target object may be determined not to be a non-defective item.

Figure 5:
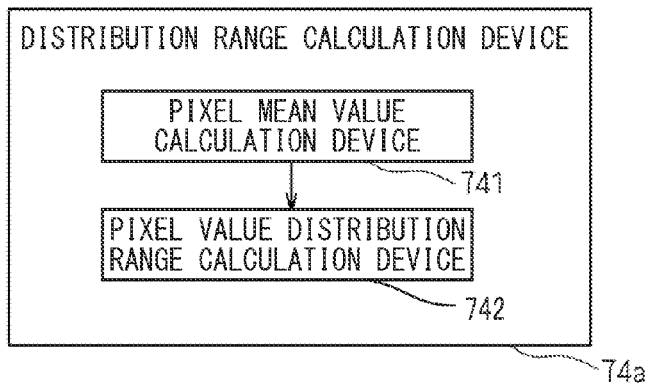
FIG. 5 is a functional block diagram illustrating a distribution range calculation device of the image processing apparatus according to the first embodiment of the present invention when selection of a first characteristic amount extraction device is received.

In this case, when selection of the first characteristic amount extraction device 73a is received, determination is made as follows. More specifically, when the extracted characteristic amount is a pixel value of a color component, a mean value of the pixel value of the color component is calculated for each pixel in the multivalued images of the non-defective items. A distribution range of a pixel value is calculated for each pixel in the multivalued images of the non-defective items based on the calculated mean value of the pixel value of the color component. FIG. 5 is a functional block diagram illustrating a distribution range calculation device 74a of the image processing apparatus 2 according to the first embodiment of the present invention when selection of the first characteristic amount extraction device 73a is received.

As shown in FIG. 5, the distribution range calculation device 74a includes a pixel mean value calculation device 741 and a pixel value distribution range calculation device 742. The main control unit 21 of the image processing unit 7 controls processing operation of the pixel mean value calculation device 741 and the pixel value distribution range calculation device 742.

The pixel mean value calculation device 741 calculates a pixel value of a color component, such as a mean value of a gray value, for each pixel in a multivalued image of each non-defective item thus obtained. The pixel value distribution range calculation device 742 calculates a distribution range of a pixel value in a multidimensional space in which each color component is a coordinate axis, based on the calculated pixel value of the color component, such as the mean value of the gray value, for each pixel in the multivalued image of each non-defective item.

For example, a three-dimensional coordinate system is assumed in which each of R component, G component, B component is a coordinate axis. In a simple method, each of mean values of R component, G component, B component is calculated, and a distribution range of each component is calculated, whereby a non-defective item is determined. In this simple method, there may be a case in which determination cannot be made based on difference of color.

For example, it is assumed that a non-defective item has a color in a range extending from white-like color to dark gray. More specifically, it is assumed that a non-defective item has a pixel value of R component of 30 to 240, a pixel value of G component of 30 to 240, and a pixel value of B component of 30 to 240. In this case, although a determination target object having a color closer to red, e.g., a determination target object having a pixel value of R component of 200, a pixel value of G component of 50, and a pixel value of B component of 100, is clearly not a non-defective item, the determination target object may be falsely determined to have pixel values included in the distribution range of the respective components. Therefore, each of the R component, G component, B component is not individually determined. Instead, determination is made as to whether an object is a non-defective item or not by determining whether the pixel values are included in the distribution ranges of the pixel values in a virtual three-dimensional space in which R component, G component, B component are coordinate axes.

Figure 6:
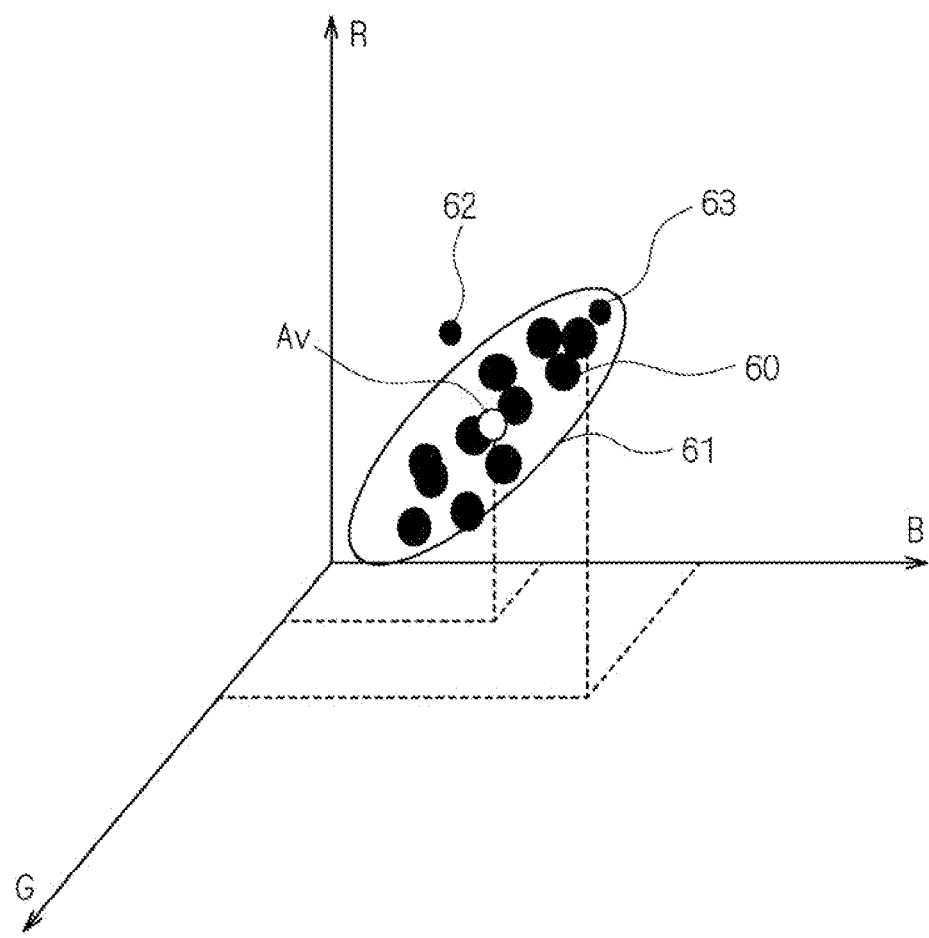
FIG. 6 is a diagram illustrating an example of distribution ranges of pixel values when selection of the first characteristic amount extraction device is received.

FIG. 6 is a diagram illustrating an example of distribution ranges of pixel values when selection of the first characteristic amount extraction device 73a is received. In FIG. 6, the pixel values of the color components are plotted as point 60, 60, . . . based on the multivalued images of the plurality of non-defective items in a three-dimensional space in which R component, G component, B component are coordinate axes perpendicular to each other. Then, a mean value Av of the pixel value of each color component is calculated, and a distribution range 61 is calculated with the calculated mean value Av being the center in the three-dimensional space. The distribution range 61 is used to determine a non-defective item.

With the above preparation, for example, points 62, 63 are considered. The points 62, 63 are obtained by plotting a pixel value of a color component for each pixel in a multivalued image of each determination target object. In this case, the point 63 is farther from the mean value Av. However, the point 63 is plotted inside of the distribution range 61, but the point 62 is plotted outside of the distribution range 61. Therefore, the determination target object plotted as the point 63 is determined to be a non-defective item, and the determination target object plotted as the point 62 is determined not to be a non-defective item.

The method for calculating the distribution range 61 is not particularly limited. For example, a Euclidean distance, i.e., a spatial distance, may be used, or a Mahalanobis distance may be used. In the description below, a case where the Mahalanobis distance is used will be described.

First, a Mahalanobis distance $D_M$ of a pixel value of a color component for each pixel can be calculated as shown in Equation 1 using a vector determinant, where a mean value of a pixel vector x (r, g, b) for each pixel in the three-dimensional axes, i.e., R axis direction, G axis direction, and B axis direction in the example of FIG. 6, is respectively defined as a mean value vector $\mu_i$ (r bar, g bar, b bar), and an inverse matrix of a variance-covariance matrix is defined as $\Sigma_i^{-1}$.

[Formula 1]

$$\{D_M(x, \mu_i)\}^2 = (x - \mu_i)^T \sum_i^{-1} (x - \mu_i) \quad \text{(Equation 1)}$$

$$= \sum_{j=1}^{n} \frac{\{(x - \mu_i)^t \varphi_j\}^2}{\lambda_j}$$

where
$x = (r, g, b)$
$\mu_i = (\bar{r}, \bar{g}, \bar{b})$

In Equation 1, $\lambda_j$ is an eigenvalue, and a vector $\varphi_j$ is an eigenvector corresponding to the eigenvalue $\lambda_j$. In other words, the Mahalanobis distance $D_M$ calculated in Equation 1 is considered to be a distance obtained by decomposing a distance between a point x (r, g, b) and a barycenter (mean value) of a distribution range 61 into an eigenvector $\varphi_j$ direction component and normalizing the $\varphi_j$ direction component with a variance $\lambda_j$. It should be noted that in Equation 1, the variable i represents a classification of distribution. In the above calculation, since there is only one distribution range 61, the variable i does not have any particular meaning.

Since this is the virtual three-dimensional space, Equation 1 is as follows. In Equation 1, n=3 holds, and there are three eigenvalues $\lambda_j$ and three eigenvectors $\varphi_j$. The eigenvector $\varphi_j$ is also a three-dimensional matrix. That is, the variance-covariance matrix $\Sigma_i$ can be represented by Equation 2.

[Formula 2]

$$\begin{bmatrix} V[r] & \text{Cov}[r, g] & \text{Cov}[r, b] \\ \text{Cov}[g, r] & V[g] & \text{Cov}[g, b] \\ \text{Cov}[b, r] & \text{Cov}[b, g] & V[b] \end{bmatrix} \quad \text{(Equation 2)}$$

In Equation 2, V denotes a variance, and the variance of each of the R component, G component, B component can be obtained from Equation 3.

[Formula 3]

$$V[r] = \frac{\sum_{k=1}^{n}(r_k - \bar{r})^2}{n} \quad \text{(Equation 3)}$$

$$V[g] = \frac{\sum_{k=1}^{n}(g_k - \bar{g})^2}{n}$$

$$V[b] = \frac{\sum_{k=1}^{n}(b_k - \bar{b})^2}{n}$$

In Equation 2, Cov denotes a covariance. A covariance of R component and G component, a covariance of R component and B component, and a covariance of G component and B component can be respectively obtained by Equation 4.

[Formula 4]

$$\begin{aligned}\operatorname{Cov}[r, g] &= \frac{\sum_{k=1}^{n}(r_k - \bar{r})(g_k - \bar{g})}{n} \\ \operatorname{Cov}[b, r] &= \frac{\sum_{k=1}^{n}(b_k - \bar{b})(r_k - \bar{r})}{n} \\ \operatorname{Cov}[g, b] &= \frac{\sum_{k=1}^{n}(g_k - \bar{g})(b_k - \bar{b})}{n}\end{aligned}$$ (Equation 4)

Equation 5 is obtained by transforming Equation 4 by multiplying denominators and numerators by n.

[Formula 5]

$$\begin{aligned}\operatorname{Cov}[r, g] &= \frac{1}{n^2}\left(n\sum_{k=1}^{n}r_k g_k - \sum_{k=1}^{n}r_k \cdot \sum_{k=1}^{n}g_k\right) \\ \operatorname{Cov}[b, r] &= \frac{1}{n^2}\left(n\sum_{k=1}^{n}b_k r_k - \sum_{k=1}^{n}b_k \cdot \sum_{k=1}^{n}r_k\right) \\ \operatorname{Cov}[g, b] &= \frac{1}{n^2}\left(n\sum_{k=1}^{n}g_k b_k - \sum_{k=1}^{n}g_k \cdot \sum_{k=1}^{n}b_k\right)\end{aligned}$$ (Equation 5)

It is understood from Equation 5 that, based on the multivalued images of the non-defective items, the variance-covariance matrix $\Sigma_i$ can be obtained by calculating, for each pixel, a summation (mean value) of pixel values of color components, a summation of squares of pixel values of color components, and a summation of values obtained by multiplying pixel values of each two sets of color components. The summation (mean value) of pixel values of color components, the summation of squares of pixel values of color components, and the summation of values obtained by multiplying pixel values of each two sets of color components are stored to the non-defective item image data storage unit 231, and a distribution range 61 for determining that an object is a non-defective item is calculated.

Subsequently, when the Mahalanobis distance $D_M$ calculated by Equation 1 for a pixel value of a color component for each pixel in the multivalued image of the determination target object is determined to be larger than a predetermined value, the pixel value is not included in the distribution range 61. The Mahalanobis distance $D_M$ is a value obtained by normalizing the distance from the barycenter of the distribution range 61 to a pixel value of a color component using a distance between the barycenter and the boundary of the distribution range 61 in a direction from the barycenter of the distribution range 61 to the pixel value of the color component. Therefore, since this indicates that the gray scale of the color changes beyond the range of the non-defective item, the object can be determined not to be a non-defective item.

In another determination method, a Euclidean distance is calculated. The Euclidean distance is a distance from a barycenter of a virtual range having a shape similar to, e.g., an elliptic sphere (hereinafter referred to as an elliptic sphere range) to a pixel value for each pixel in the second multivalued image. Determination is made as to whether the pixel value is included in an intercorrelation distribution range by determining whether the calculated Euclidean distance is less than a predetermined value based on a distance between the barycenter and the boundary of the elliptic sphere range in a direction from the barycenter of the elliptic sphere range to the pixel value for each pixel in the second multivalued image. When the Euclidean distance is used, the degree of deviation from the intercorrelation distribution range in which an object is determined to be a non-defective item can be calculated while the sensitivity is not greatly changed by the magnitude of extension of the distribution.

It should be noted that the distribution range 61 is not necessarily limited to the elliptic sphere range. Alternatively, a range of a rectangular solid shape inscribed by the distribution range 61 may be virtually calculated. The coordinate values are converted into a coordinate system having coordinate axes, i.e., a major axis of the virtual elliptic sphere range and two minor axes perpendicular to the major axis and passing through the central point of the elliptic sphere range, and the mean value and the intercorrelation distribution range are recalculated for each element for each pixel in the first multivalued images in the converted coordinate system. The pixel values are calculated in the converted coordinate system for each pixel in the obtained second multivalued images, and determination is made as to whether the calculated pixel value for each element for each pixel in the second multivalued images is included in the recalculated intercorrelation distribution range for each element for each pixel in the first multivalued image. Therefore, the load of arithmetic processing can be greatly reduced without greatly sacrificing the detection accuracy.

Figure 7:
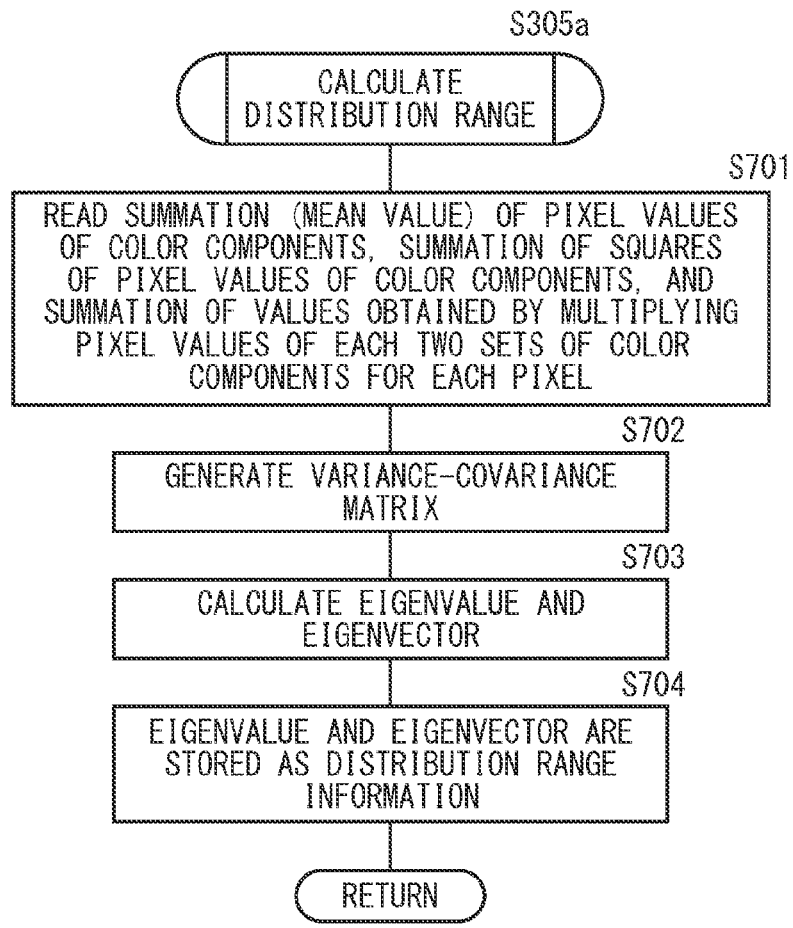
FIG. 7 is a flowchart illustrating a procedure of distribution range calculation processing performed by the main control unit of the image processing apparatus according to the first embodiment of the present invention when selection of the first characteristic amount extraction device is received.

FIG. 7 is a flowchart illustrating a procedure of distribution range calculation processing performed by the main control unit 21 of the image processing apparatus 2 according to the first embodiment of the present invention when selection of the first characteristic amount extraction device 73a is received. Such processing corresponds to step S305a of FIG. 3.

In FIG. 7, the main control unit 21 of the image processing apparatus 2 reads the summation (mean value) of pixel values of color components, the summation of squares of the pixel values of color components, and the summation of values obtained by multiplying the pixel values of each two sets of color components for each pixel in the respective multivalued image, which are calculated based on the plurality of multivalued images of the non-defective items and stored to the non-defective item image data storage unit 231 (step S701), and a variance-covariance matrix $\Sigma_i$ including the pixel values of the color components of the respective pixels is generated (step S702). In other words, the variance-covariance matrix $\Sigma_i$ as shown in Equation 2 is generated.

The main control unit 21 calculates the eigenvalue $\lambda_j$ and the eigenvector $\phi_j$ of the variance-covariance matrix $\Sigma_i$ (step S703), and stores the eigenvalue $\lambda_j$ and the eigenvector $\phi_j$ to the distribution range information storage unit 232 as distribution range information about the distribution range (step S704).

The determination as to whether a characteristic amount is included in the distribution ranges in step S404 of FIG. 4 is made as follows. A pixel value of a color component is calculated as a characteristic amount for each pixel in the obtained multivalued image of the determination target object. When the Mahalanobis distance $D_M$ that can be calculated by Equation 1 is determined to be larger than a predetermined value, the characteristic amount is determined not to be included in the distribution range 61, and accordingly, the object is determined not to be a non-defective item.

Figure 8:
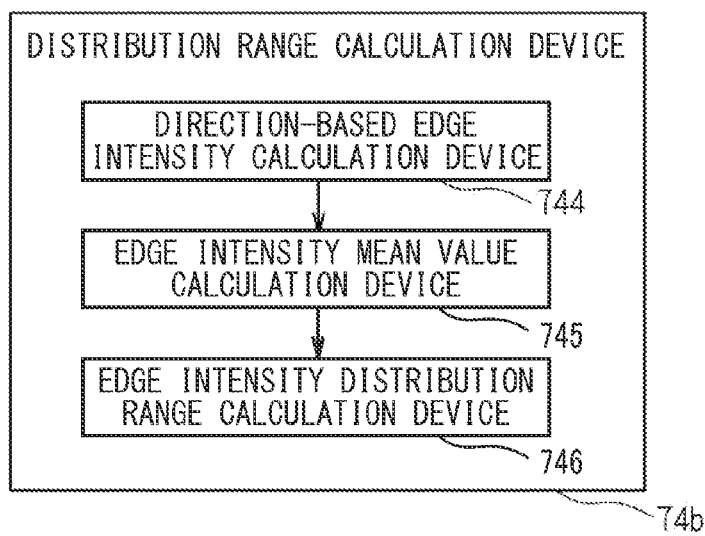
FIG. 8 is a functional block diagram illustrating a distribution range calculation device of the image processing apparatus according to the first embodiment of the present invention when selection of a second characteristic amount extraction device is received.

Subsequently, when selection of the second characteristic amount extraction device 73b is received, i.e., when the extracted characteristic amount includes edge intensities in two different directions, a mean value of the edge intensities in two different directions are calculated for each pixel in the respective multivalued images, and an intercorrelation distribution range of the edge intensities is calculated for each pixel in the respective multivalued images with the calculated mean value being the center. FIG. 8 is a functional block diagram illustrating the distribution range calculation device 74b when selection of the second characteristic amount extraction device 73b of the image processing apparatus 2 according to the first embodiment of the present invention is received.

As shown in FIG. 8, the distribution range calculation device 74b includes a direction-based edge intensity calculation device 744, an edge intensity mean value calculation device 745, and an edge intensity distribution range calculation device 746. The main control unit 21 of the image processing unit 7 controls processing operations of the direction-based edge intensity calculation device 744, the edge intensity mean value calculation device 745, and the edge intensity distribution range calculation device 746.

The direction-based edge intensity calculation device 744 calculates the edge intensities in two different directions for each pixel in the respective multivalued images obtained. The directions in which the edge intensities are calculated are not particularly limited. In the first embodiment, the edge intensities are respectively calculated in a row direction and a column direction, i.e., two different directions, of a two-dimensional image. More specifically, a 3×3 window template used in a Sobel filter may be used to calculate the edge intensities in the row direction and the column direction.

The edge intensity mean value calculation device 745 calculates a mean value of the edge intensities in two different directions for each pixel in the respective multivalued images based on the edge intensities in two different directions of each calculated pixel.

The edge intensity distribution range calculation device 746 calculates an intercorrelation distribution range of the edge intensities in two different directions for each pixel in the respective multivalued image with the calculated mean value being the center.

Figure 9:
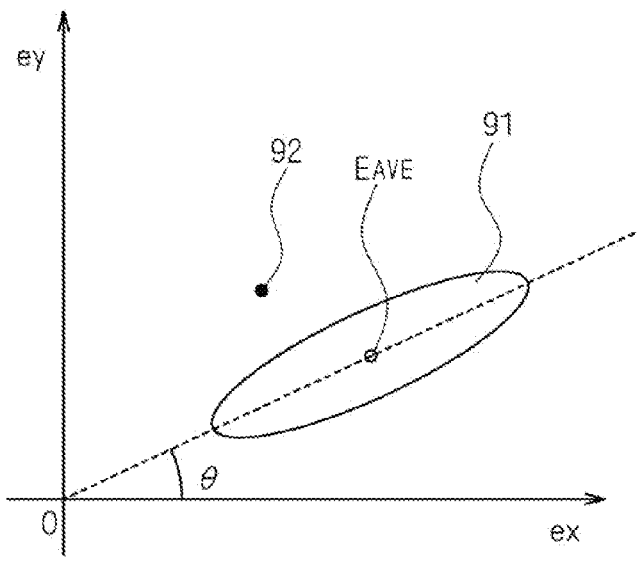
FIG. 9 is a diagram illustrating an example of an intercorrelation distribution range of edge intensities in two different directions for each predetermined pixel of the image processing apparatus according to the first embodiment of the present invention.

FIG. 9 is a diagram illustrating an example of an intercorrelation distribution range of edge intensities in two different directions for each predetermined pixel of the image processing apparatus 2 according to the first embodiment of the present invention. In FIG. 9, an edge intensity ex in a row direction of the two-dimensional image is adopted as an X axis, and an edge intensity ey in a column direction thereof is adopted as a Y axis.

Since the edge intensity mean value calculation device 745 calculates a mean value of the edge intensities ex in the row direction of the two-dimensional image and a mean value of the edge intensities ey in the column direction thereof for each pixel of the respective multivalued images, a mean value vector $E_{AVE}$ of the edge intensities for each pixel in the multivalued images is on a line inclined at an edge angle θ. For example, when there is a large variation in the obtained edge intensities of each pixel in the respective multivalued images (first multivalued images) of the plurality of non-defective items, and they have substantially the same edge direction, the calculated edge intensities are distributed in a virtual elliptic region having a center at a position where the major axis and the minor axis cross each other at the mean value vector $E_{AVE}$ of the edge intensities of the multivalued images of the non-defective items. Therefore, determination as to whether a determination target object is a non-defective item or not can be made by calculating an edge intensity for each pixel in the multivalued image of the determination target object and determining whether an edge point 92 obtained by plotting the edge intensity ex of the pixel in the row direction and the edge intensity ey of the pixel in the column direction of the two-dimensional image is included in an intercorrelation distribution range 91 or not.

The method for calculating the intercorrelation distribution range 91 is not particularly limited. For example, a Euclidean distance, i.e., a spatial distance, may be used, or a Mahalanobis distance may be used. In the description below, a case where the Mahalanobis distance is used will be described.

In this case, a distance calculation device 79 of the determination device 78 as shown in FIG. 2 calculates a Mahalanobis distance obtained by normalizing a distance from a barycenter of a distribution range, i.e., a barycenter (central point) of the intercorrelation distribution range 91 (virtual elliptic region) in the example of FIG. 9, to an edge point (characteristic amount) for each pixel in the multivalued image of the determination target object, using a distance between the barycenter and the boundary of the distribution range 91 in a direction between the barycenter and the boundary of the intercorrelation distribution range 91 in the direction from the barycenter to the edge point (characteristic amount).

A Mahalanobis distance $D_M$ of the edge intensities for each pixel can be calculated as shown in Equation 6 using a vector determinant where a mean value of an edge intensity vector x (ex, ey) for each pixel in the two different directions, i.e., in the X axis direction and the Y axis direction in the example of FIG. 9, is denoted with a mean value vector μi ($e_x$ bar, $e_y$ bar) and an inverse matrix of a variance-covariance matrix is denoted with $\Sigma_{i-1}$.

[Formula 6]

$$\{D_M(x, \mu_i)\}^2 = (x - \mu_i)^T \sum_i^{-1} (x - \mu_i)$$

$$= \sum_{j=1}^{n} \frac{\{(x - \mu_i)^t \varphi_j\}^2}{\lambda_j}$$

(Equation 6)

where
$x = (e_x, e_y)$
$\mu_i = (\bar{e}_x, \bar{e}_y)$

In Equation 6, $\lambda_j$ is an eigenvalue, and a vector $\varphi_j$ is an eigenvector corresponding to the eigenvalue $\lambda_j$. In other words, the Mahalanobis distance $D_M$ calculated in Equation 6 is considered to be a distance obtained by decomposing a distance between a point x (ex, ey) and a barycenter of the intercorrelation distribution range 91 into an eigenvector $\varphi_j$ direction component and normalizing the eigenvector $\varphi_j$ direction component with a variance $\lambda_j$. It should be noted that in Equation 6, the variable i represents a classification of distribution. In the above calculation, since there is only one intercorrelation distribution range 91, the variable i does not have any particular meaning.

In contrast to FIG. 6, since this is a two-dimensional space in two different directions, Equation 6 is as follows. In Equation 6, n=2 holds, and there are two eigenvalues $\lambda_j$ and two eigenvectors $\varphi_j$. The eigenvector $\varphi_j$ is also a two-dimensional matrix. That is, the variance-covariance matrix $\Sigma_i$ can be represented by the following Equation 7.

[Formula 7]

$$\begin{bmatrix} V[e_x] & \text{Cov}[e_x, e_y] \\ \text{Cov}[e_y, e_x] & V[e_y] \end{bmatrix} \quad \text{(Equation 7)}$$

In Equation 7, V denotes a variance, and the variance of the edge intensity in the X axis direction and the edge intensity in the Y axis direction can be obtained from Equation 8 below.

[Formula 8]

$$V[e_x] = \frac{\sum_{k=1}^{n} \{(e_x)_k - \overline{e}_x\}^2}{n}$$
$$V[e_y] = \frac{\sum_{k=1}^{n} \{(e_y)_k - \overline{e}_y\}^2}{n} \quad \text{(Equation 8)}$$

In Equation 8, Cov denotes a covariance. A covariance of the edge intensity in the X axis direction and the edge intensity in the Y axis direction can be respectively obtained by Equation 9.

[Formula 9]

$$\text{Cov}[e_x, e_y] = \frac{\sum_{k=1}^{n} \{(e_x)_k - \overline{e}_x\}\{(e_y)_k - \overline{e}_y\}}{n}$$
$$= \frac{1}{n^2} \left\{ n \sum_{k=1}^{n} (e_x)_k (e_y)_k - \sum_{k=1}^{n} (e_x)_k \cdot \sum_{k=1}^{n} (e_y)_k \right\} \quad \text{(Equation 9)}$$

It is understood from Equation 9 that, based on the multivalued images of the non-defective items, the variance-covariance matrix $\Sigma_i$ can be obtained by calculating, for each pixel, a summation (mean value) of edge intensities in two different directions, a summation of squares of the edge intensities in two different directions, and a summation of values obtained by multiplying the edge intensities in two different directions. The summation (mean value) of edge intensities in two different directions, the summation of squares of the edge intensities in two different directions, and the summation of values obtained by multiplying the edge intensities in two different directions are stored to the non-defective item image data storage unit 231, and an intercorrelation distribution range 91 for determining that an object is a non-defective item is calculated.

Subsequently, when the Mahalanobis distance $D_M$ calculated by Equation 6 for edge intensities in two different directions (X axis direction and Y axis direction) for each pixel in the multivalued image of the determination target object is determined to be larger than a predetermined value, the edge point is not included in the intercorrelation distribution range 91. The Mahalanobis distance $D_M$ is a value obtained by normalizing the distance from the barycenter of the intercorrelation distribution range 91 to an edge point (characteristic amount) using a distance between the barycenter and the boundary of the intercorrelation distribution range 91 in a direction from the barycenter of the intercorrelation distribution range 91 to the edge point (characteristic amount). Therefore, since this indicates that the edge angle changes beyond the range of the non-defective item, the shape of the contour line can be determined to change greatly, and accordingly, the object can be determined not to be a non-defective item.

Figure 10:
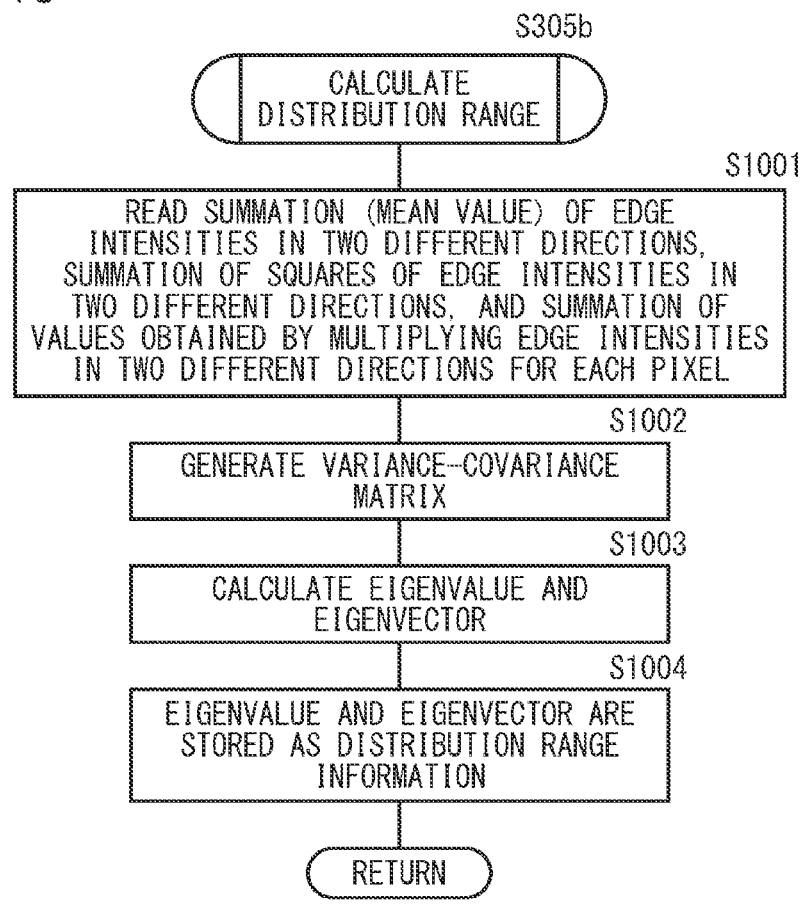
FIG. 10 is a flowchart illustrating a procedure of distribution range calculation processing performed by the main control unit of the image processing apparatus according to the first embodiment of the present invention when selection of the second characteristic amount extraction device is received.

FIG. 10 is a flowchart illustrating a procedure of distribution range calculation processing performed by the main control unit 21 of the image processing apparatus 2 according to the first embodiment of the present invention when selection of the second characteristic amount extraction device 73b is received. Such processing corresponds to step S305b of FIG. 3.

In FIG. 10, the main control unit 21 of the image processing apparatus 2 reads the summation (mean value) of edge intensities in two different directions, the summation of squares of the edge intensities in two different directions, and the summation of values obtained by multiplying the edge intensities in two different directions for each pixel in the respective multivalued image, which are calculated based on the multivalued images of the non-defective items and stored to the non-defective item image data storage unit 231 (step S1001), and a variance-covariance matrix $\Sigma_i$ of the edge intensities in two different directions of the respective pixels is generated (step S1002).

The main control unit 21 calculates the eigenvalue $\lambda_j$ and the eigenvector $\phi_j$ of the variance-covariance matrix $\Sigma_i$ (step S1003), and stores the eigenvalue $\lambda_j$ and the eigenvector $\phi_j$ to the distribution range information storage unit 232 as distribution range information about the intercorrelation distribution range (step S1004).

Then, the determination as to whether a characteristic amount is included in the distribution ranges in step S404 of FIG. 4 is made as follows. Edge intensities in two different directions are calculated as a characteristic amount for each pixel in the obtained multivalued image of the determination target object. When the Mahalanobis distance $D_M$ that can be calculated by Equation 6 is determined to be larger than a predetermined value, the characteristic amount is determined not to be included in the intercorrelation distribution range 91, and accordingly, the object is determined not to be a non-defective item.

Figure 11:
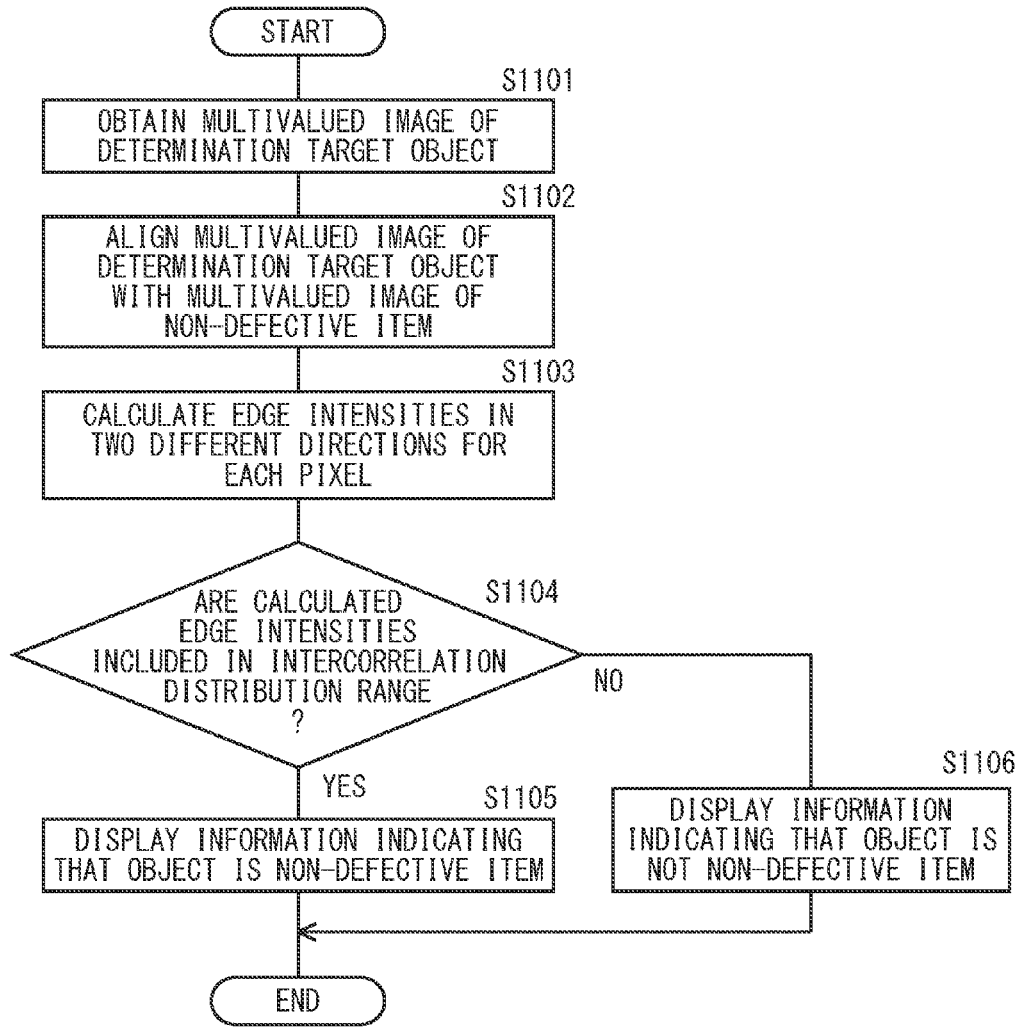
FIG. 11 is a flowchart illustrating a procedure of non-defective item determination processing performed by the main control unit of the image processing apparatus according to the first embodiment of the present invention when an index value is used.

FIG. 11 is a flowchart illustrating a procedure of non-defective item determination processing performed by the main control unit 21 of the image processing apparatus 2 according to the first embodiment of the present invention when an index value is used. The main control unit 21 of the image processing apparatus 2 obtains a multivalued image of a determination target object picked up by the camera 1 (step S1101). The main control unit 21 aligns the obtained multivalued image of the determination target object with the multivalued images of the non-defective items stored in the non-defective item image data storage unit 231 (step S1102). More specifically, the main control unit 21 calculates mean value images of the plurality of multivalued images of the non-defective items, and the multivalued image is aligned with the mean value images. The means for aligning the multivalued images is not particularly limited as long as it is a well-known technique.

The main control unit 21 calculates edge intensities in two different directions for each pixel in the obtained multivalued images (step S1103). The directions in which the edge intensities are calculated are not particularly limited. Similar to the above method, the edge intensities are respectively calculated in a column direction and a row direction, i.e., two different directions, of a two-dimensional image.

The main control unit 21 determines whether the calculated edge intensities of each pixel in the multivalued image are included in the calculated intercorrelation distribution range of the edge intensities of each pixel of the plurality of multivalued images of the non-defective items (step S1104). When the main control unit 21 determines that the calculated edge intensities are included in the intercorrelation distribution range (step S1104: YES), the main control unit 21 determines that the determination target object is a non-defective item, and displays information indicating that the determination target object is a non-defective item on the display screen of the display apparatus 3 as a determination result (step S1105). When the main control unit 21 determines that the calculated edge intensities are not included in the intercorrelation distribution range (step S1104: NO), the main control unit 21 determines that the determination target object is not a non-defective item, and displays information indicating that the determination target object is not a non-defective item on the display screen of the display apparatus 3 as a determination result (step S1106).

Figure 12:
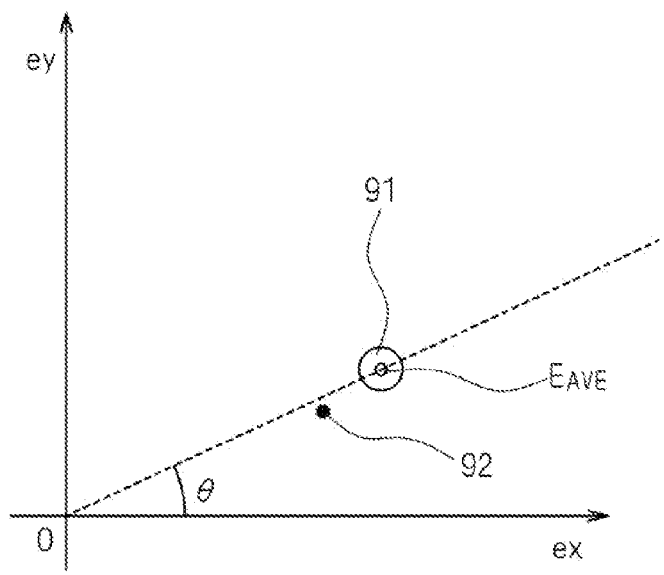
FIG. 12 is a diagram illustrating an example of an intercorrelation distribution range of edge intensities at a predetermined pixel in the image processing apparatus according to the first embodiment of the present invention when there is a small variation in the edge intensities and the direction of the variation is random.

In the first embodiment described above, the intercorrelation distribution range is the virtual elliptic region. For example, when there is a small variation in the edge intensities in the obtained multivalued image of the non-defective item, and the direction of variation is random, the calculated edge intensities are distributed in a virtual circular region having a center at the mean value vector $E_{AVE}$ of the edge intensities of the multivalued images of the non-defective items. FIG. 12 is a diagram illustrating an example of an intercorrelation distribution range of edge intensities at a predetermined pixel in the image processing apparatus 2 according to the first embodiment of the present invention when there is a small variation in the edge intensities and the direction of variation is random. In FIG. 12, similar to FIG. 9, an edge intensity ex in a row direction of the two-dimensional image is adopted as an X axis, and an edge intensity ey in a column direction thereof is adopted as a Y axis.

As shown in FIG. 12, when a non-defective item based on which the intercorrelation distribution range 91 is calculated has high degree of accuracy, the intercorrelation distribution range 91 is calculated as an extremely small circular region having a center at the mean value vector $E_{AVE}$ of the edge intensities in the multivalued images of the non-defective items. When the edge intensities in the multivalued image of the determination target object is calculated for each pixel, and determination is made as to whether an edge point 92 obtained by plotting the edge intensity ex of the pixel in the row direction and the edge intensity ey of the pixel in the column direction of the two-dimensional image is included in the intercorrelation distribution range 91, the intercorrelation distribution range 91 is in a small range, which allows detection of even subtle difference, e.g., sharpness of a contour line, subtle difference in a shape, and the like, as compared with FIG. 9.

Figure 13:
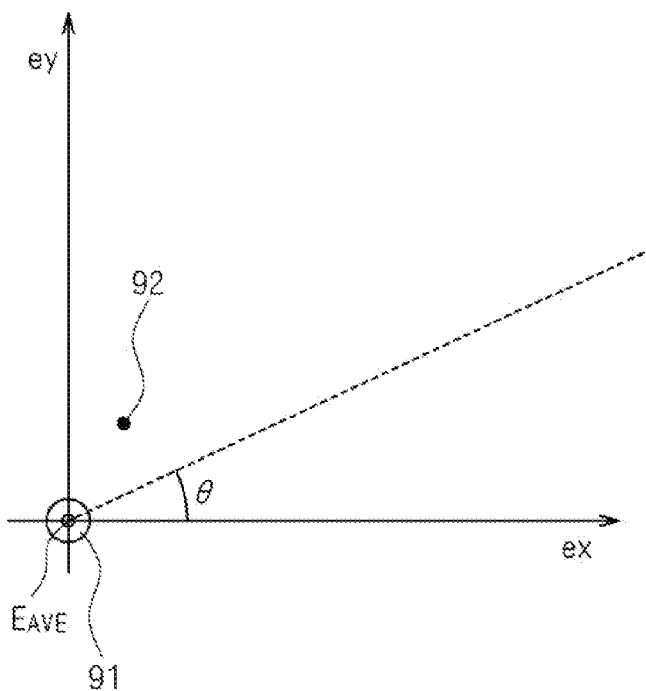
FIG. 13 is a diagram illustrating an example of an intercorrelation distribution range of edge intensities at a predetermined pixel in a portion other than a contour line in the image processing apparatus according to the first embodiment of the present invention.

On the other hand, the edge intensities are usually close to zero (0) in portions other than the contour lines of a non-defective item. Therefore, the calculated edge intensities are distributed in a virtual circular region having an origin at the mean value vector $E_{AVE}$ of the edge intensities. FIG. 13 is a diagram illustrating an example of an intercorrelation distribution range of edge intensities at a predetermined pixel in a portion other than a contour line in the image processing apparatus 2 according to the first embodiment of the present invention. In FIG. 13, similar to FIG. 9, an edge intensity ex in a row direction and an edge intensity ey in a column direction, i.e., two different directions, of the two-dimensional image are respectively adopted as an X axis and a Y axis.

As shown in FIG. 13, in portions other than the contour lines of a non-defective item, the intercorrelation distribution range 91 is calculated as an extremely small circular region having a center at the mean value vector $E_{AVE}$ of the edge intensities in the multivalued images of the non-defective items. When the edge intensities in the multivalued image of the determination target object are calculated for each pixel, and determination is made as to whether an edge point 92 obtained by plotting the edge intensity ex of the pixel in the row direction and the edge intensity ey of the pixel in the column direction of the two-dimensional image for a certain pixel is included in the intercorrelation distribution range 91, the intercorrelation distribution range 91 is in a small range, which allows detection of a subtle difference in the shape even if the difference is a scratch and a dent made on the surface of the determination target object which are difficult to be detected by a conventional method.

Figure 14:
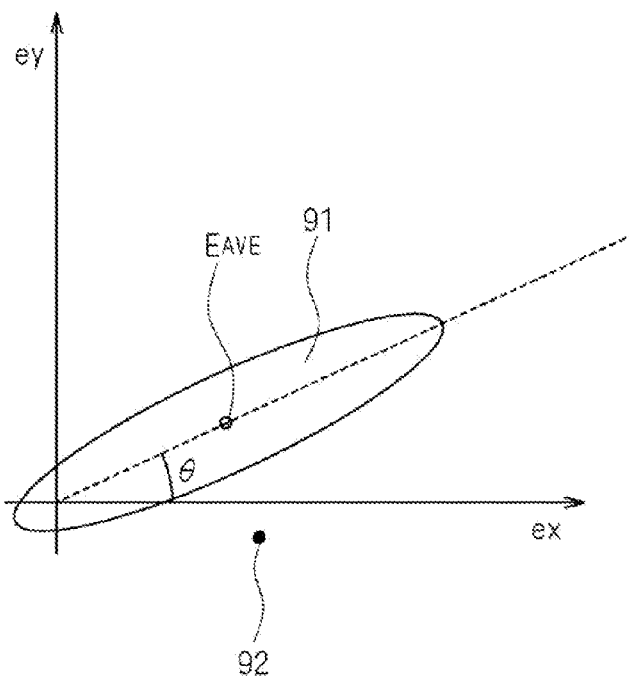
FIG. 14 is a diagram illustrating an example of an intercorrelation distribution range of edge intensities at a predetermined pixel in the image processing apparatus according to the first embodiment of the present invention when a contour line greatly varies.

When a small distortion exists in a contour line in each non-defective item, i.e., when a contour line greatly varies to such an extent that pixels in proximity to the contour line is sometimes the contour line and sometimes not the contour line, a distribution range extends to include points in proximity to an origin even if the distribution range is a virtual elliptic region. FIG. 14 is a diagram illustrating an example of an intercorrelation distribution range of edge intensities at a predetermined pixel in the image processing apparatus 2 according to the first embodiment of the present invention when a contour line greatly varies. In FIG. 14, similar to FIG. 9, an edge intensity ex in a row direction of the two-dimensional image is adopted as an X axis, and an edge intensity ey in a column direction thereof is adopted as a Y axis.

As shown in FIG. 14, when the contour line greatly varies, the intercorrelation distribution range 91 exists in a larger range than in FIG. 9. In this case, it is impossible to detect subtle blur of the contour line, a small displacement in the position thereof, and the like. However, an edge point 92 obtained by plotting the edge intensity ex in the row direction and the edge intensity ey in the column direction of a two-dimensional image of a determination target object having a burr, a loss, and the like changes in a direction of an edge intensity, and is therefore not included in the intercorrelation distribution range 91. Therefore, presence of the burr, the loss, and the like can be easily detected.

Figure 15:
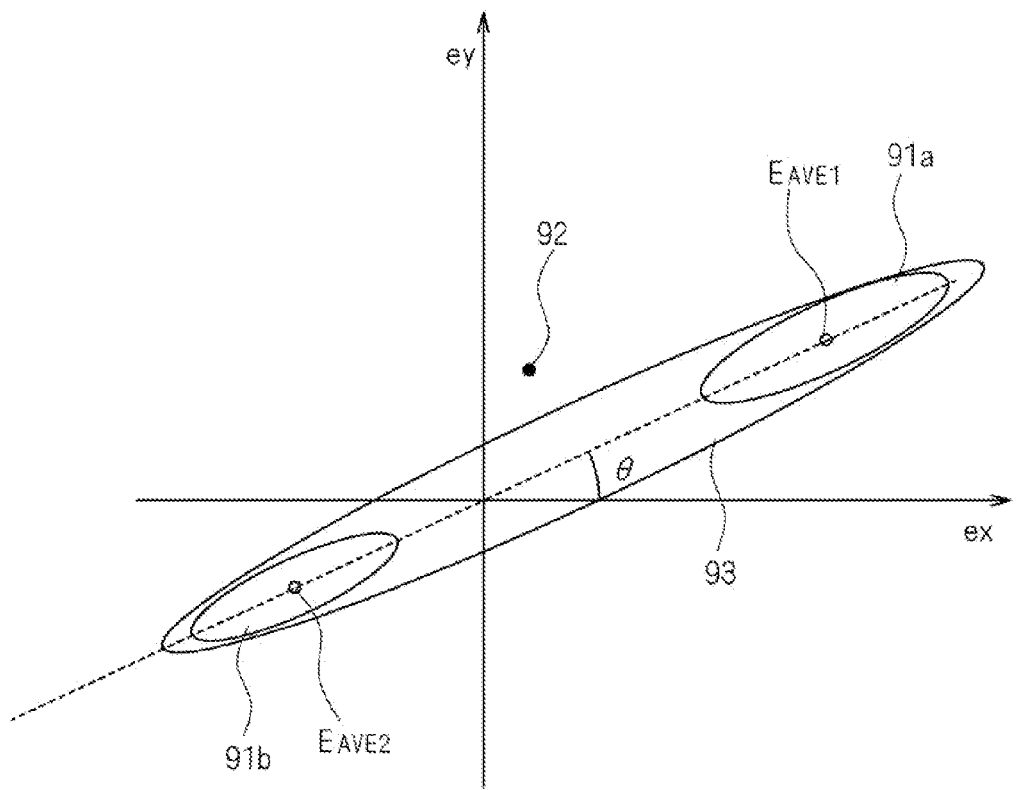
FIG. 15 is a diagram illustrating an example of an intercorrelation distribution range of edge intensities at a predetermined pixel in the image processing apparatus according to the first embodiment of the present invention in which an edge intensity varies is substantially the same.

Further, when there is a difference, e.g., each non-defective item has a different color, and a direction in which an edge intensity varies in a multivalued image of the non-defective item is reversed, calculated edge intensities may be distributed in a plurality of virtual circular regions with a center being the mean value vector $E_{AVE}$ of the edge intensities. FIG. 15 is a diagram illustrating an example of an intercorrelation distribution range of edge intensities at a predetermined pixel in the image processing apparatus 2 according to the first embodiment of the present invention when a direction in which an edge intensity varies is substantially the same. In FIG. 15, similar to FIG. 9, an edge intensity ex in a row direction of the two-dimensional image is adopted as an X axis, and an edge intensity ey in a column direction thereof is adopted as a Y axis.

As shown in FIG. 15, when each non-defective item based on which the intercorrelation distribution range is calculated has a different color, and a direction in which an edge intensity varies in a multivalued image of the non-defective item is reversed, mean values of edge intensities have two mean value vectors $E_{AVE1}$, $E_{AVE2}$, and intercorrelation distribution ranges 91a, 91b are calculated as virtual elliptic regions with centers at the mean value vectors $E_{AVE1}$, $E_{AVE2}$ of the edge intensities. When the edge intensities in the multivalued image of the determination target object is calculated for each pixel, and determination is made as to whether an edge point 92 obtained by plotting the edge intensity ex of the pixel in the row direction and the edge intensity ey of the pixel in the column direction of the two-dimensional image is included in the intercorrelation distribution ranges 91a, 91b, the determination is made as to whether it is included in an approximate distribution range 93 by calculating the distribution range (approximate distribution range) 93 including the intercorrelation distribution ranges 91a, 91b.

The method for calculating the approximate distribution range 93 is not particularly limited.

In a range included in the approximate distribution range 93 but not included in the intercorrelation distribution ranges 91a, 91b, the directions of the edge intensities can be determined to be substantially the same. For example, when the shape is different, the direction of the edge intensity is greatly different. Therefore, the edge point 92 obtained by plotting the edge intensity ex in the row direction and the edge intensity ey in the column direction, i.e., two different directions, of the two-dimensional image for a certain pixel is displaced from the approximate distribution range 93. Therefore, the change of the edge intensities can be reliably found, and determination as to whether an object is a non-defective item or not can be made.

When the determination as to whether it is included in the intercorrelation distribution range or not is made by mathematical operations, the intercorrelation distribution range is an elliptic range having an angle θ, and therefore, the main control unit 21 has to take a high load in the arithmetic processing. Therefore, when the intercorrelation distribution range is a virtual elliptic range, coordinate values may be converted into a coordinate system in which a major axis of the elliptic shape and a minor axis perpendicular to the major axis and passing through a central point of the elliptic shape are adopted as coordinate axes, and edge intensities of respective elements, mean values of the edge intensities of the respective elements, and distribution ranges of the edge intensities of the respective elements may be recalculated for each pixel in the obtained multivalued images of the non-defective items with the major axis direction and the minor axis direction of the converted coordinate system being two different directions.

As described above, according to the first embodiment, at least one from the devices for extracting the characteristic amount based on which determination is made as to whether an object is a non-defective item or not can be selected according to the property of the obtained multivalued image (second multivalued image) of the determination target object. Therefore, an appropriate characteristic amount extraction device 73 is selected, whereby a defect can be detected even when the defect occurs in proximity to a contour line, and a color difference can also be detected with a high sensitivity. For example, when a characteristic amount extraction device 73 of which selection is received extracts a pixel value of a color component as a characteristic amount, variation of gray level caused by the color difference can be detected. When a characteristic amount extraction device 73 of which selection is received extracts edge intensities in two different directions as characteristic amounts, defect in proximity to a contour line can be detected.

Second Embodiment

A configuration of an image processing apparatus according to a second embodiment of the present invention is similar to the first embodiment, and the detailed description thereof will not be given by attaching the same reference numerals. The second embodiment is different from the first embodiment in that selection of a third characteristic amount extraction device 73c for extracting a characteristic amount of a surface roughness of a determination target object can be received as a device for extracting a characteristic amount.

Figure 16:
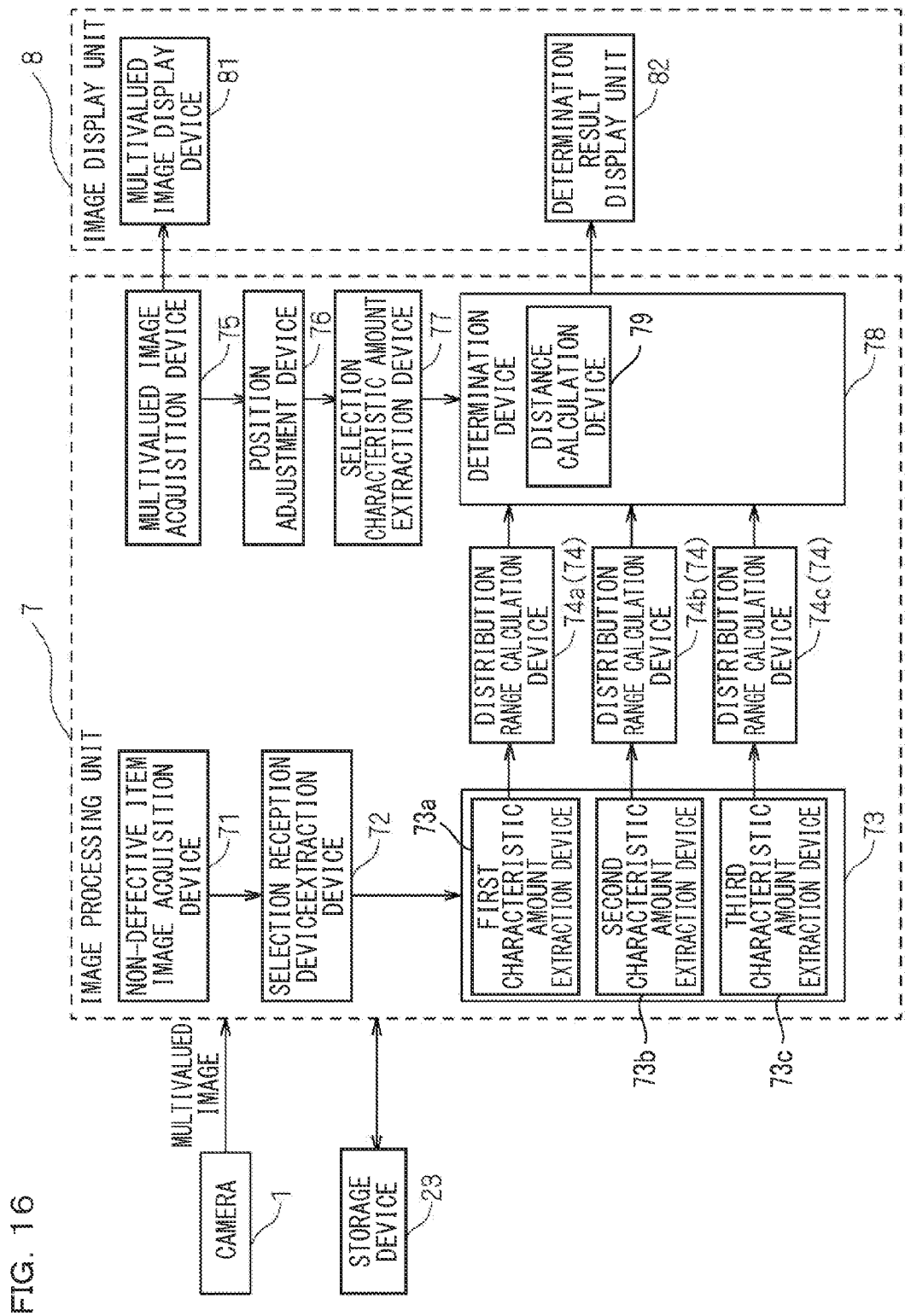
FIG. 16 is a functional block diagram illustrating an example of a configuration of an image processing apparatus according to a second embodiment of the present invention when a third characteristic amount extraction device is included.
Figure 17:
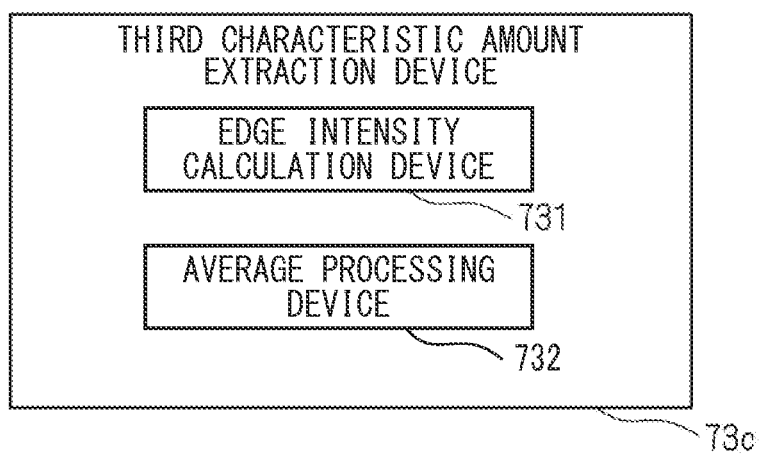
FIG. 17 is a functional block diagram illustrating a third characteristic amount extraction device in the image processing apparatus according to the second embodiment of the present invention.

When selection of the third characteristic amount extraction device 73c is received, a characteristic amount representing a magnitude of variation of pixel values for each pixel may be extracted as the characteristic amount of the surface roughness of a determination target object. However, when local variance of pixel values is calculated for each pixel, a main control unit 21 has to take a high load in the arithmetic processing. Accordingly, in an edge intensity image obtained by calculating edge intensities of pixel values, average processing with peripheral pixels is executed on each pixel, so that the load of arithmetic processing is reduced, and the characteristic amount represents the surface roughness of the determination target object. FIG. 16 is a functional block diagram illustrating an example of the configuration of the image processing apparatus 2 according to the second embodiment of the present invention when the third characteristic amount extraction device 73c is included. FIG. 17 is a functional block diagram illustrating the third characteristic amount extraction device 73c in the image processing apparatus 2 according to the second embodiment of the present invention.

As shown in FIG. 16, the characteristic amount extraction device 73 includes a third characteristic amount calculation device 73c in addition to a first characteristic amount extraction device 73a, and a second characteristic amount calculation device 73b. The distribution range calculation device 74 calculates a distribution range for determining a non-defective item based on the characteristic amount respectively extracted by the characteristic amount extraction device 73 of which selection is received. When the selection of the first characteristic amount extraction device 73a is received, a distribution range calculation device 74a calculates a distribution range. When the selection of the second characteristic amount extraction device 73b is received, a distribution range calculation device 74b calculates a distribution range. When the selection of the third characteristic amount extraction device 73c is received, a distribution range calculation device 74c calculates a distribution range. The information about the calculated distribution ranges is stored to a distribution range information storage unit 232 of a storage device 23 as a function expression, a coordinate value, and a threshold value representing a boundary of a distribution range.

As shown in FIG. 17, the third feature extraction device 73c for extracting a roughness characteristic amount includes an edge intensity calculation device 731 and an average processing device 732. The main control unit 21 of the image processing unit 7 controls processing operation of the edge intensity calculation device 731 and the average processing device 732.

The edge intensity calculation device 731 calculates an edge intensity as a roughness characteristic amount for each pixel of respective multivalued images obtained. Unlike the first embodiment, however, this is not limited to edge intensities in two different directions. For example, a square root of a summation of squares of values obtained using well-known Sobel filter in two different directions or a summation of absolute values of each of them may be calculated. The average processing device 732 executes average processing based on the calculated edge intensities for each pixel in the respective multivalued images. The average processing is not particularly limited as long as it is a well-known method. For example, 3×3, 5×5 average filters may be used to perform average processing.

When the average processing is simply executed based on the pixel values in the respective multivalued images, it is impossible to distinguish roughness, the degree of asperity, and the like of a multivalued image of a determination target object. Therefore, difference of surface roughness cannot be detected from the image on which the average processing is executed. In contrast, when the average processing is executed based on the edge intensities for each pixel, a pixel having a larger degree of asperity has a larger value, and a pixel having a smaller degree of asperity has a smaller value.

When selection of the third characteristic amount extraction device 73c is received, the distribution range is identified by a predetermined value of each pixel. In other words, determination as to whether an object is a non-defective item or not can be made by determining whether a difference value between a roughness characteristic amount of each pixel in the multivalued image of the determination target object and a mean value of roughness characteristic amounts of respective pixels in the multivalued images of the plurality of non-defective items is less than a predetermined value for each pixel.

Figure 18:
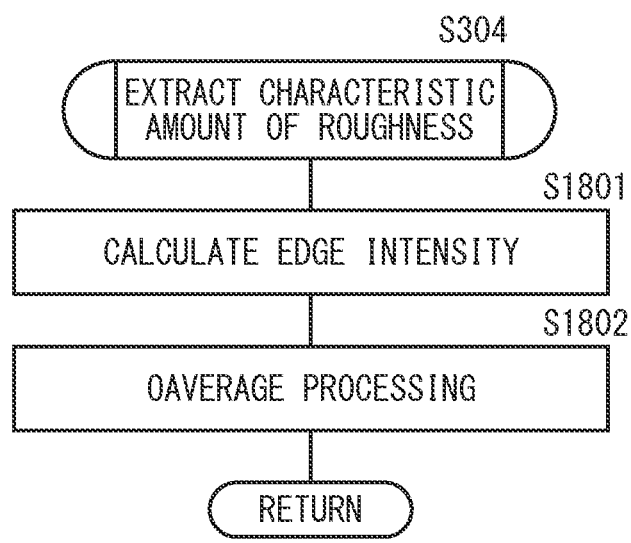
FIG. 18 is a flowchart illustrating a procedure of roughness characteristic amount extraction processing performed by a main control unit of the image processing apparatus according to the second embodiment of the present invention when selection of the third characteristic amount extraction device is received.

FIG. 18 is a flowchart illustrating a procedure of roughness characteristic amount extraction processing performed by the main control unit 21 of the image processing apparatus 2 according to the second embodiment of the present invention when selection of the third characteristic amount extraction device 73c is received. This corresponds to the processing of step S304 in FIG. 3 that is performed when selection of the third characteristic amount extraction device 73c is received.

In FIG. 18, the main control unit 21 of the image processing apparatus 2 calculates an edge intensity as a roughness characteristic amount for each pixel in the multivalued images, which are calculated based on the plurality of multivalued images of the non-defective items and stored to the non-defective item image data storage unit 231 (step S1801). Unlike the first embodiment, however, this is not limited to edge intensities in two different directions. For example, a square root of a summation of squares of values obtained using well-known Sobel filter in two different directions or a summation of absolute values of each of them may be calculated.

The main control unit 21 executes average processing based on the calculated edge intensities for each pixel in the respective multivalued images (step S1802). The average processing is not particularly limited as long as it is a well-known method. For example, 3×3 and 5×5 average filters may be used to perform average processing.

It should be noted that the distribution range serving as the basis of determination may be calculated as an index value of a roughness characteristic amount for each pixel. In this case, for example, a standard deviation using mean values of pixels and mean values of roughness characteristic amounts of pixels is calculated. An index value of each pixel can be obtained by multiplying the calculated standard deviation of each pixel by a constant and adding a constant thereto.

Figure 19:
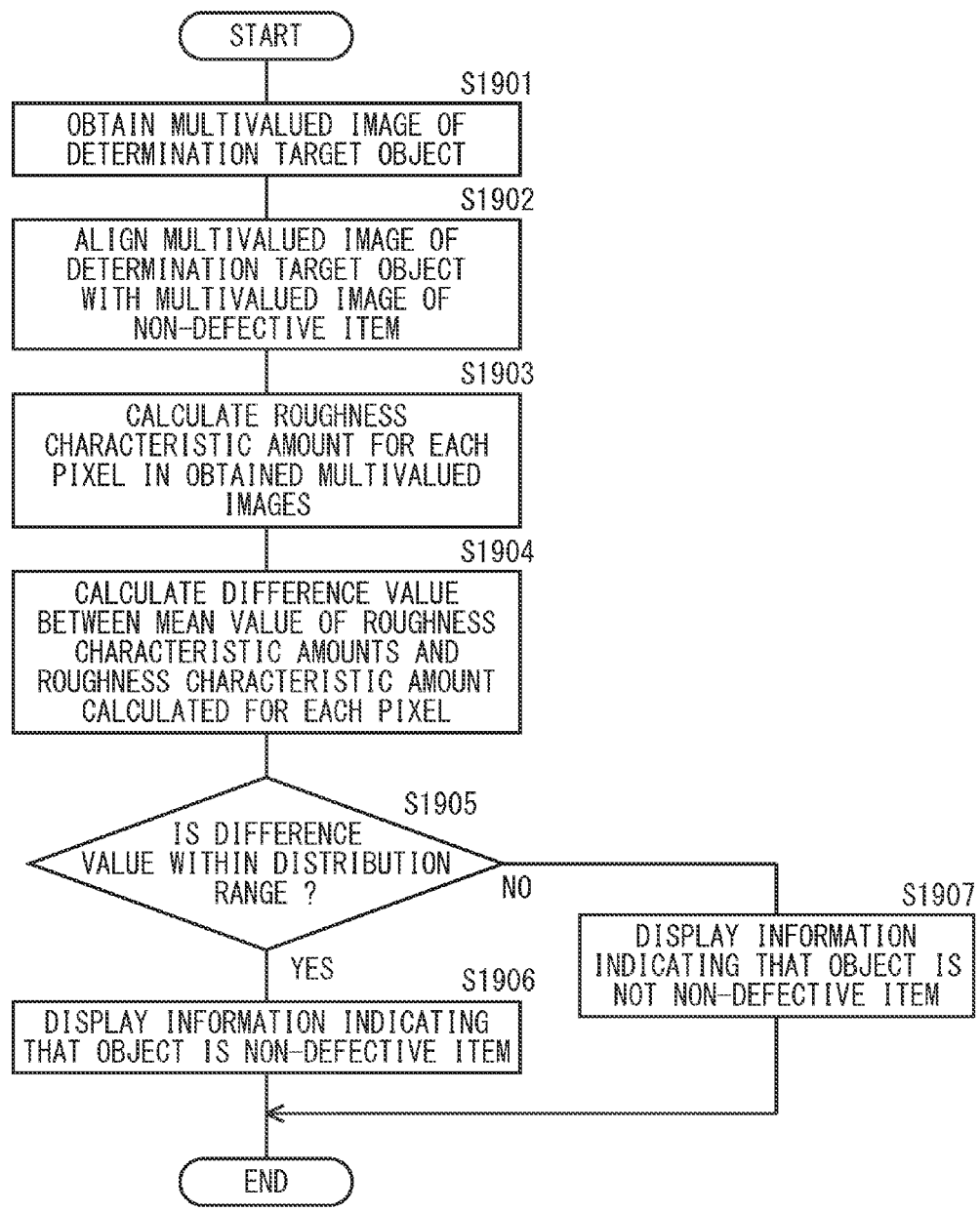
FIG. 19 is a flowchart illustrating a procedure of non-defective item determination processing performed by the main control unit of the image processing apparatus according to the second embodiment of the present invention when an index value is used.

FIG. 19 is a flowchart illustrating a procedure of non-defective item determination processing performed by the main control unit 21 of the image processing apparatus 2 according to the second embodiment of the present invention when the index value is used. The main control unit 21 of the image processing apparatus 2 obtains a multivalued image of a determination target object picked up by the camera 1 (step S1901). The main control unit 21 aligns the obtained multivalued image of the determination target object with the multivalued images of the non-defective items stored in the non-defective item image data storage unit 231 (step S1902). More specifically, the main control unit 21 calculates mean value images of the plurality of multivalued images of the non-defective items, and the multivalued image is aligned with the mean value images. The means for aligning the multivalued images is not particularly limited as long as it is a well-known technique.

The main control unit 21 calculates a roughness characteristic amount for each pixel in the obtained multivalued images, i.e., edge intensities on which the average processing has been executed (step S1903), and calculates a difference value between the calculated roughness characteristic amount and a mean value of roughness characteristic amounts calculated from the images of the non-defective item (step S1904). Using the calculated difference value as an index value, the main control unit 21 determines whether the index value is included in the distribution range or not (step S1905).

When the main control unit 21 determines that the index value is included in the distribution range (step S1905: YES), the main control unit 21 determines that the determination target object is a non-defective item, and displays information indicating that the determination target object is a non-defective item on the display screen of the display apparatus 3 as a determination result (step S1906).

When the main control unit 21 determines that the index value is not included in the distribution ranges (step S1905: NO), the main control unit 21 determines that the determination target object is not a non-defective item, and displays information indicating that the determination target object is not a non-defective item on the display screen of the display apparatus 3 as a determination result (step S1907).

As described above, according to the second embodiment, the roughness characteristic amount is calculated for each pixel in the obtained multivalued image (second multivalued image) of the determination target object, and determination is made as to whether the difference value between the calculated roughness characteristic amount and the mean value of roughness characteristic amounts of pixels in the multivalued images (first multivalued images) of the non-defective items is less than the predetermined value, whereby roughness, the degree of asperity, and the like of the multivalued image of the determination target object can be distinguished, and the difference of the surface roughness of the determination target object can be reliably detected.

The present invention is not limited to the above embodiments, and various kinds of changes, improvements, and the like can be made within the scope of the gist of the present invention. In the above embodiments, the two different directions are the column direction and the row direction of a two-dimensional image. However, the two different directions are not particularly limited. On the other hand, the color components are not limited to R component, G component, and B component. The color components may be cyan component, magenta component, and yellow component.

What is claimed is:

1. An image processing apparatus for determining whether a target object is defective or not by comparing a multivalued image obtained from the target object with a group of multivalued images obtained from non-defective items, the image processing apparatus comprising:

a non-defective item image acquisition device for obtaining a plurality of first multivalued images of non-defective items picked up by an image pickup device;

a selection reception device for receiving selection of any one of a plurality of characteristic amount extraction devices including at least a first characteristic amount extraction device and a second characteristic amount extraction device, wherein the first characteristic amount extraction device extracts, as a characteristic amount, a pixel value of a color component for each pixel in the obtained first multivalued images, the second characteristic amount extraction device extracts, as a characteristic amount, edge intensities in two different directions for each pixel in the obtained first multivalued images;

a distribution range calculation device for calculating a distribution range for determining the non-defective item based on a characteristic amount extracted by a characteristic amount extraction device of which selection is received;

a multivalued image acquisition device for obtaining a second multivalued image of a determination target object; and a determination device for extracting, for each pixel in the obtained second multivalued image, a characteristic amount with the characteristic amount extraction device of which selection is received, and determining whether the characteristic amount is included in the distribution range corresponding to the extracted characteristic amount, wherein when selection of the first characteristic amount extraction device is received, the distribution range calculation device includes:

a pixel mean value calculation device for calculating a mean value of pixel values of color components in respective pixels in the obtained first multivalued images; and a pixel value distribution range calculation device for calculating a distribution range of pixel values in a multidimensional space, in which the color components are respectively adopted as coordinate axes, for each pixel in the first multivalued images based on the calculated mean values of the pixel values of the color components, and the determination device is configured to calculate a pixel value of a color component for each pixel in the obtained second multivalued image, and determine whether the pixel value is included in the distribution range of the pixel values in the multidimensional space in which the color components are respectively adopted as coordinate axes, and when selection of the second characteristic amount extraction device is received, the distribution range calculation device includes:

a direction-based edge intensity calculation device for calculating edge intensities in two different directions for each pixel in the obtained first multivalued images;

an edge intensity mean value calculation device for calculating a mean value of edge intensities in two different directions for each pixel in the first multivalued images, based on the calculated edge intensities; and an edge intensity distribution range calculation device for calculating an intercorrelation distribution range of edge intensities in two different directions for each pixel in the first multivalued images with the calculated mean value being a center, and the determination device is configured to calculate edge intensities in two different directions for each pixel in the obtained second multivalued image, and determine whether the edge intensities are included in the intercorrelation distribution range corresponding to the calculated edge intensities.

2. The image processing apparatus according to claim 1, wherein the direction-based edge intensity calculation device is configured to calculate the edge intensities in two directions perpendicular to each other.

3. The image processing apparatus according to claim 2, wherein the direction-based edge intensity calculation device is configured to calculate the edge intensities in two directions of a row direction and a column direction in a two-dimensional image.

4. The image processing apparatus according to claim 1, wherein the distribution range calculation device is configured to calculate the intercorrelation distribution range as a virtual elliptic region.

5. The image processing apparatus according to claim 4, wherein the determination device includes a distance calculation device for calculating a Mahalanobis distance obtained by normalizing a distance from a barycenter of the virtual elliptic region to the characteristic amount extracted from the second multivalued image for each pixel of the second multivalued image using a distance between the barycenter and a boundary of the elliptic region in a direction from the barycenter to the characteristic amount, the determination as to whether the edge intensities are included in the intercorrelation distribution range is configured to be made by determining whether the calculated Mahalanobis distance is less than a predetermined value or not.

6. The image processing apparatus according to claim 4, wherein the distance calculation device is configured to calculate a Euclidean distance which is a distance from a barycenter of the virtual elliptic region to the characteristic amount extracted from the second multivalued image for each pixel of the second multivalued image, and the determination device is configured to determine whether the edge intensities are included in the intercorrelation distribution range or not by determining whether the calculated Euclidean distance is less than a predetermined value or not.

7. The image processing apparatus according to claim 1 further comprising a position adjustment device for aligning the first multivalued images and the second multivalued image.

8. The image processing apparatus according to claim 1 further comprising a third characteristic amount extraction device for extracting a characteristic amount of a surface roughness of the determination target object, wherein when selection of the third characteristic amount extraction device is received, the distribution range calculation device is configured to calculate a mean value and a distribution range of each pixel based on a roughness characteristic amount of each pixel of the obtained first multivalued images, and determine whether a difference value between the mean value and a roughness characteristic amount of the second multivalued image for each pixel is less than a predetermined value or not.

9. The image processing apparatus according to claim 1, wherein the determination device determines that the determination target object is not a non-defective item when the selection reception device receives selection of a plurality of characteristic amount extraction devices, and any one of the characteristic amounts extracted by the characteristic amount extraction devices of which selection is received is determined not to be included in the distribution range corresponding to the characteristic amount.

10. An image processing method that is executed by an image processing apparatus for determining whether a target object is defective or not by comparing a multivalued image obtained from the target object with a group of multivalued images obtained from non-defective items, the image processing method comprising the steps of:
- obtaining a plurality of first multivalued images of non-defective items picked up by an image pickup device;
- receiving selection of any one of a plurality of extraction steps including at least a first extraction step and a second extraction step, wherein the first extraction step extracts, as a characteristic amount, a pixel value of a color component for each pixel in the obtained first multivalued images, the second extraction step extracts, as a characteristic amount, edge intensities in two different directions for each pixel in the obtained first multivalued images;
- extracting a characteristic amount with an extraction step of which selection is received, and calculating a distribution range for determining the non-defective item based on the extracted characteristic amount;
- obtaining a second multivalued image of the determination target object; and
- extracting, for each pixel in the obtained second multivalued image, a characteristic amount with the extraction step of which selection is received, and determining whether the characteristic amount is included in the distribution range corresponding to the extracted characteristic amount,
- wherein when selection of the first extraction step is received, the calculating a distribution range for determining the non-defective item includes:
- calculating a mean value of pixel values of color components in respective pixels in the obtained first multivalued images; and
- calculating a distribution range of pixel values in a multidimensional space, in which the color components are respectively adopted as coordinate axes, for each pixel in the first multivalued images based on the calculated mean values of the pixel values of the color components, and
- determining whether the characteristic amount is included in the distribution range is calculating a pixel value of a color component for each pixel in the obtained second multivalued image, and determine whether the pixel value is included in the distribution range of the pixel values in the multidimensional space in which the color components are respectively adopted as coordinate axes, and
- when selection of the second characteristic amount extraction device is received, the calculating a distribution range for determining the non-defective item includes:
- calculating edge intensities in two different directions for each pixel in the obtained first multivalued images;
- calculating a mean value of edge intensities in two different directions for each pixel in the first multivalued images, based on the calculated edge intensities; and
- calculating an intercorrelation distribution range of edge intensities in two different directions for each pixel in the first multivalued images with the calculated mean value being a center, and
- determining whether the characteristic amount is included in the distribution range is calculating edge intensities in two different directions for each pixel in the obtained second multivalued image, and determining whether the edge intensities are included in the intercorrelation distribution range corresponding to the calculated edge intensities.

11. A non-transitory computer readable storage medium for storing a computer program that is executed by an image processing apparatus for determining whether a target object is defective or not by comparing a multivalued image obtained from the target object with a group of multivalued images obtained from non-defective items, the computer program causing the image processing apparatus to function as:
- a non-defective item image acquisition device for obtaining a plurality of first multivalued images of non-defective items picked up by an image pickup device;
- a selection reception device for receiving selection of any one of a plurality of characteristic amount extraction devices including at least a first characteristic amount extraction device and a second characteristic amount extraction device, wherein the first characteristic amount extraction device extracts, as a characteristic amount, a pixel value of a color component for each pixel in the obtained first multivalued images, the second characteristic amount extraction device extracts, as a characteristic amount, edge intensities in two different directions for each pixel in the obtained first multivalued images;
- a distribution range calculation device for calculating a distribution range for determining the non-defective item based on a characteristic amount extracted by a characteristic amount extraction device of which selection is received;
- a multivalued image acquisition device for obtaining a second multivalued image of the determination target object; and
- a determination device for extracting, for each pixel in the obtained second multivalued image, a characteristic amount with the characteristic amount extraction device of which selection is received, and determining whether the characteristic amount is included in the distribution range corresponding to the extracted characteristic amount,
- wherein when selection of the first characteristic amount extraction device is received, the distribution range calculation device includes:
- a pixel mean value calculation device for calculating a mean value of pixel values of color components in respective pixels in the obtained first multivalued images; and
- a pixel value distribution range calculation device for calculating a distribution range of pixel values in a multidimensional space, in which the color components are respectively adopted as coordinate axes, for each pixel in the first multivalued images based on the calculated mean values of the pixel values of the color components, and
- the determination device is configured to calculate a pixel value of a color component for each pixel in the obtained second multivalued image, and determine whether the pixel value is included in the distribution range of the pixel values in the multidimensional space in which the color components are respectively adopted as coordinate axes, and
- when selection of the second characteristic amount extraction device is received, the distribution range calculation device includes:
- a direction-based edge intensity calculation device for calculating edge intensities in two different directions for each pixel in the obtained first multivalued images;
- an edge intensity mean value calculation device for calculating a mean value of edge intensities in two different directions for each pixel in the first multivalued images, based on the calculated edge intensities; and
- an edge intensity distribution range calculation device for calculating an intercorrelation distribution range of edge intensities in two different directions for each pixel in the first multivalued images with the calculated mean value being a center, and the determination device is configured to calculate edge intensities in two different directions for each pixel in the obtained second multivalued image, and determine whether the edge intensities are included in the intercorrelation distribution range corresponding to the calculated edge intensities.

12. The image processing method according to claim 10, wherein calculating edge intensities in two different directions is calculating the edge intensities in two directions perpendicular to each other.

13. The image processing method according to claim 12, wherein calculating edge intensities in two different directions is calculating the edge intensities in two directions of a row direction and a column direction in a two-dimensional image.

14. The image processing method according to claim 10 further comprising a third extraction step for extracting a characteristic amount of a surface roughness of the determination target object, wherein when selection of the third extraction step is received, calculating a mean value and a distribution range of each pixel based on a roughness characteristic amount of each pixel of the obtained first multivalued images, and determining whether a difference value between the mean value and a roughness characteristic amount of the second multivalued image for each pixel is less than a predetermined value or not.

15. The non-transitory computer readable storage medium according to claim 11, wherein the direction-based edge intensity calculation device is configured to calculate the edge intensities in two directions perpendicular to each other.

16. The non-transitory computer readable storage medium according to claim 15, wherein the direction-based edge intensity calculation device is configured to calculate the edge intensities in two directions of a row direction and a column direction in a two-dimensional image.

17. The non-transitory computer readable storage medium according to claim 11 further comprising a third characteristic amount extraction device for extracting a characteristic amount of a surface roughness of the determination target object, wherein when selection of the third characteristic amount extraction device is received, the distribution range calculation device is configured to calculate a mean value and a distribution range of each pixel based on a roughness characteristic amount of each pixel of the obtained first multivalued images, and determine whether a difference value between the mean value and a roughness characteristic amount of the second multivalued image for each pixel is less than a predetermined value or not.

* * * * *